(12) United States Patent
Gubbala et al.

(10) Patent No.: US 12,100,387 B2
(45) Date of Patent: Sep. 24, 2024

(54) SYSTEMS AND METHODS TO IDENTIFY PRODUCTS FROM VERBAL UTTERANCES

(71) Applicant: Walmart Apollo, LLC, Bentonville, AR (US)

(72) Inventors: Praneeth Gubbala, Milpitas, CA (US); Xuan Zhang, Georgetown, TX (US); Bahula Bosetti, Bentonville, AR (US); Priya Ashok Kumar Choudhary, Sunnyvale, CA (US); Dong T. Nguyen, Wylie, TX (US); Shivraj V. Kodak, San Mateo, CA (US); William Craig Robinson, Jr., Centeron, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 339 days.

(21) Appl. No.: 17/730,027

(22) Filed: Apr. 26, 2022

(65) Prior Publication Data
US 2023/0343326 A1 Oct. 26, 2023

(51) Int. Cl.
*G10L 15/08* (2006.01)
*G06F 16/683* (2019.01)
(Continued)

(52) U.S. Cl.
CPC ......... *G10L 15/063* (2013.01); *G06F 16/685* (2019.01); *G10L 15/02* (2013.01); *G10L 2015/086* (2013.01)

(58) Field of Classification Search
None
See application file for complete search history.

(56) References Cited

U.S. PATENT DOCUMENTS 6,829,603 B1    12/2004  Yue
8,078,502 B2 *  12/2011  Hao ............... G06Q 30/0613
                                                705/26.61
(Continued)

FOREIGN PATENT DOCUMENTS

CN          111444719 A      7/2020

OTHER PUBLICATIONS

Agarwal, Sanchit, et al.; "Parsing Coordination for Spoken Language Understanding"; Oct. 26, 2018; IEEE 2018 Spoken Language Technology (SLT 2018); https://doi.org/10.48550/arXiv.1810.11497; pp. 1-8.
(Continued)

*Primary Examiner* — Nafiz E Hoque
(74) *Attorney, Agent, or Firm* — Foley IP Law, PLLC

(57) ABSTRACT

Some embodiments provide retail product ordering systems comprising: a user computing device comprising an application executed by a device control circuit to: receive an audible utterance; controls a product identifier application interface to: apply a tokenizer model and obtain a set of individual search words; apply a series of featurizer models to the search words to generate features; and apply a classifier and extractor model based on the features and generate multiple requested product entities each comprising a respective sub-set of the position labeled product terms; wherein the device control circuit is further configured to access a purchase history database, confirm an accuracy of each of requested product entities relative to a purchase history, generate a listing of determined product identifiers corresponding to the confirmed set of the multiple requested product entities, and control a display system of the user computing device to render the listing of determined product identifiers.

18 Claims, 7 Drawing Sheets

(51) Int. Cl.
    *G10L 15/02* (2006.01)
    *G10L 15/06* (2013.01)

(56) References Cited

U.S. PATENT DOCUMENTS

| | | | | |
|---|---|---|---|---|
| 10,872,601 | B1* | 12/2020 | Acharya | G06F 40/295 |
| 2020/0175566 | A1* | 6/2020 | Bender | G06Q 30/0633 |
| 2021/0248321 | A1* | 8/2021 | Cheng | G06F 18/214 |

OTHER PUBLICATIONS

Agarwal, Sanchit; "How Alexa Knows "Peanut Butter" Is One Shopping-List Item, Not Two"; https://www.amazon.science/blog/how-alexa-knows-peanut-butter-is-one-shopping-list-item-not-two; Dec. 18, 2018; 8 pages.

Bunk, Tanja et al.; "Diet: Lightweight Language Understanding for Dialogue Systems"; https://doi.org/10.48550/arXiv.2004.09936; Apr. 21, 2020; 9 pages.

Devlin, Jacob et al.; "BERT: Pre-Training of Deep Bidirectional Transformers for Language Understanding"; https://doi.org/10.48550/arXiv.1810.04805; Oct. 11, 2018; 16 pages.

Gubbala, Praneeth et al.; "Sequence to Sequence Model for Extracting Multiple Product Name Entities"; https://www.youtube.com/watch?v=WPzT0A1tbfw; Oct. 29, 2021; pp. 1.

Gubbala, Praneeth et al.; A Sequence to Sequence Model for Extracting Multiple Product Name Entities from Dialog; WeCNLP 2021; Oct. 29, 2021; 3 pages.

Henderson, Matthew et al.; "ConveRT: Efficient and Accurate Conversational Representations from Transformers"; https://doi.org/10.48550/arXiv.1911.03688; Nov. 9, 2019; 11 pages.

Kingma, Diederik et al.; "Adam: A Method for Stochastic Optimization"; https://doi.org/10.48550/arXiv.1412.6980; Dec. 22, 2014; 15 pages.

Lampe, Guillaume et al.; "Neural architectures for named entity recognition"; https://doi.org/10.48550/arXiv.1603.01360; Mar. 4, 2016; 11 pages.

Liu, Yinhan et al.; "RoBERTa: A Robustly Optimized BERT Pretraining Approach"; https://doi.org/10.48550/arXiv.1907.11692; Jul. 26, 2019; 13 pages.

Ratinov, Lev et al.; "Design challenges and misconceptions in named entity recognition"; Proceedings of the thirteenth conference on computational natural language learning (CoNLL-2009); 2009; pp. 147-155.

Smith, Samuel L. et al.; "Don't Decay the Learning Rate, Increase the Batch Size"; https://doi.org/10.48550/arXiv.1711.00489; Nov. 1, 2017, 11 pages.

Vaswani, Ashish et al.; "Attention Is All You Need"; 2017; https://doi.org/10.48550/arXiv.1706.03762; 15 pages.

Wang, Xinyu, et al.; "Improving Named Entity Recognition by External Context Retrieving and Cooperative Learning"; Jun. 2, 2021; University of Chinese Academy of Sciences, DAMO Academy, Alibaba Group; https://doi.org/10.48550/arXiv.2105.03654; pp. 1-13.

\* cited by examiner

SYSTEMS AND METHODS TO IDENTIFY PRODUCTS FROM VERBAL UTTERANCES

TECHNICAL FIELD

This invention relates generally to speech recognition.

BACKGROUND

Speech recognition has numerous applications. Previous speech recognition systems have limited accuracy. Accordingly, previous speech recognition systems are limited in their effectiveness for many applications.

BRIEF DESCRIPTION OF THE DRAWINGS

Disclosed herein are embodiments of systems, apparatuses and methods pertaining to speech recognition. This description includes drawings, wherein.

Figure 1:
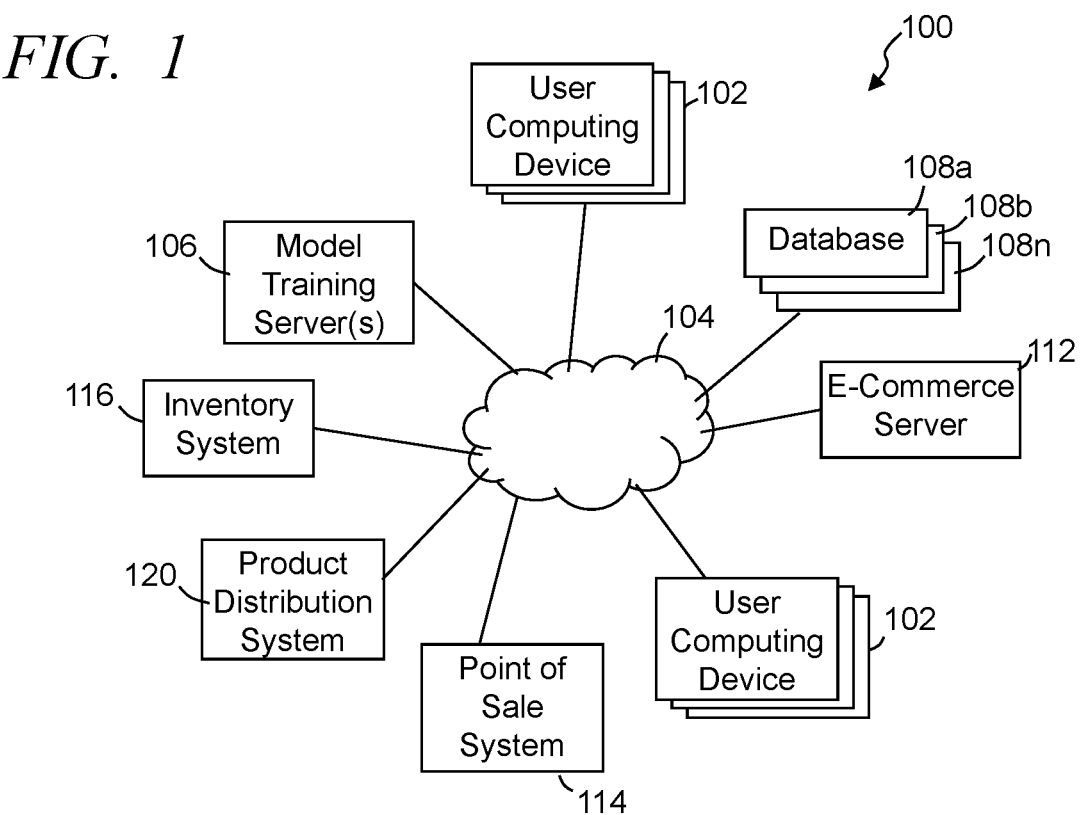
FIG. 1 illustrates a simplified block diagram of an exemplary speech recognition and item identifier system implementing a speech recognition system that identifies individual product identifier entities from one or more utterances, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

The present embodiments provide machine learning based systems that improve speech recognition by at least in part improving item recognition, product recognition, product name recognition and/or other such speech recognition from one or more utterances that include a series of multiple words. The voice ordering systems according to some embodiments enhance the recognition of multiple product name entities from ordering utterances. Existing voice ordering systems are typically limited to capturing only a single product name. This prevents users from being able to speak a single utterance that identifies multiple different items with that single utterance. Further, other speech recognition systems are generally incapable of generalizing multiple product name entity recognition (MPNER) tasks due at least in part to the ambiguity in voice utterances. Some present embodiments, however, solve this problem through a developed sequence of machine learning models and/or algorithms that cooperatively operate to accurately identify terms, their relationship with other terms, and a confirmation of accuracy of product identifying entities. Further, some embodiments provide a simplified model architecture than traditional speech systems, which typically require extensive processing pipelines that generally perform poorly when used with an utterance that include multiple different product entities and/or utterances that do not include delimiters that distinguish between different product entities. The speech recognition systems, in at least some embodiments, further improve system performance by reducing memory requirements and reducing computation processing requirements in part through customization of respective machine learning models based on a user, group of users and/or the user computing device.

Some embodiments implement one or more Entity Transformer (ET) neural network architectures that are trained to recognize numerous different product identifying entities in a single utterance and/or text. Further, some embodiments provide sequence to sequence modeling for extracting multiple product name entities from dialog and/or text. Similarly, the utterances do not have to include express delimiters separating the different product entities, but is similarly capable of identifying separate product entities when delimiters are included. Additionally, the present embodiments provide extensive training and retraining to continue to enhance the modeling to improve the product identifier entities within utterances.

As a simple example, a sample utterance might include "add seven apples one gallon of whole milk two bags of sunflower seeds fresh garlic disposable wipes." The task of product name entity recognition intends to identify separate product entities such as "apples", "milk", "sunflower seeds", "fresh garlic", and "disposable wipes". The number of product names greatly increases the complexity and difficulty in segmenting and extracting the individual product entities. Similarly, the diversity of product names further increases the difficulties in accurately segmenting and extracting the product identifying entities. Still further, the descriptors, adjectives, numbers and other aspects of the utterance (e.g., "seven", "while", "two", "fresh", etc.) additionally increase the complexity of accurately separating and identifying product name entities. Automated speech recognition (ASR) systems typically do not produce punctuations and symbols when translating voice into text, due to their limitation. This similarly significantly increases the challenge to separate adjacent product name entities. Since these barriers (e.g., entity amount, missing punctuation, and product diversity) are unusual for traditional NER tasks, existing methods are ineffective at multiple product name entity recognition.

Some embodiments provide retail product ordering systems implemented on a user computing device that typically includes one or more transceivers, an audio detecting system, and a device control circuit of a user computing device that executes one or more applications. The transceiver(s), of the user computing device, is configured to wired and/or wirelessly communicate over one or more distributed communication networks. The audio detecting system is configured to capture audio input. The device control circuit in executing the application is configured to receive, via the audio detecting system, an audio utterance of a request comprising a series of request words captured from the audible utterance, wherein the request words are separated based on respective pauses within the respective utterance and the series of request words does not include other delimiters provided in the utterance separating the request words. Further, in some implementations, the device control circuit further controls a product identifier application interface to apply a tokenizer model, trained based on training utterance words each comprising sets of multiple words, to the series of request words and obtain a set of individual search words corresponding to the request words from the utterance; apply a series of featurizer models to the set of individual search words to generate features of the search words, wherein the series of featurizer models are trained based on sets of predefined product identifiers wherein each of a plurality of the sets of the predefined product identifiers comprises multiple predefined identifier words corresponding to a single product of multiple different products sold by a retail entity; and apply a classifier and extractor model, trained based on the sets of predefined product identifiers comprising multiple product terms each having position labels, based on the features of the search words and generate multiple requested product entities, wherein a plurality of the multiple requested product entities each comprise a respective sub-set of the position labeled product terms ordered in accordance with the corresponding position label dictating a position of the respective position labeled product term relative to the other one or more of the product terms of the respective sub-set of the position labeled product terms of the respective requested product entity. In some embodiments, the device control circuit is further configured to access a purchase history database comprising product information of products previously purchased, confirm an accuracy of each of the set multiple requested product entities relative to a purchase history associated with the user, generate a listing of determined product identifiers comprising purchased product identifiers corresponding to the confirmed set of the multiple requested product entities, and control a display system of the user computing device to render the listing of determined product identifiers.

Some embodiments provide methods of enabling retail product ordering. One or more audible utterances of a request are received, through an audio detecting system of a user computing device. In some implementations, the utterance includes a series of request words captured from the audible utterance. The request words can be separated based on respective pauses within the respective utterance and the series of request words does not include other delimitators provided in the utterance separating the request words. A tokenizer model is applying, by a product identifier application interface. The tokenizer model is typically trained based on training utterance words each comprising sets of multiple words. Based on the series of request words, the tokenizer model provides a set of individual search words corresponding to the request words from the utterance. A series of featurizer models, trained based on sets of predefined product identifiers wherein each of a plurality of the sets of the predefined product identifiers comprises multiple predefined identifier words corresponding to a single product of multiple different products sold by a retail entity, are applied to the set of individual search words and generating features of the search words. A classifier and extractor model, trained based on the sets of predefined product identifiers comprising multiple product terms each having position labels, can be applied based on the features of the search words to generate and/or identify multiple requested product entities. In some embodiments, a plurality of the multiple requested product entities each comprise a respective sub-set of the position labeled product terms ordered in accordance with the corresponding position label dictating a position of the respective position labeled product term relative to the other one or more of the product terms of the respective sub-set of the position labeled product terms of the respective requested product entity. A device control circuit of the user computing device can access a purchase history database comprising product information of products previously purchased, to confirm an accuracy of each of the set multiple requested product entities relative to a purchase history associated with the user, generate a listing of determined product identifiers comprising purchased product identifiers corresponding to the confirmed set of the multiple requested product entities, and control a display system of the user computing device to render the listing of determined product identifiers.

FIG. 1 illustrates a simplified block diagram of an exemplary speech recognition and item identifier system 100 implementing a speech recognition system that identifies individual product identifier entities from one or more utterances, in accordance with some embodiments. The item identifier system 100 includes multiple user computing devices 102 that are geographically distributed and communicatively coupled with one or more distributed wired and/or wireless communication networks 104 (e.g., cellular communication network(s), Internet, local area network(s) (LAN), wide area network(s) (WAN), Wi-Fi network(s), Bluetooth network, other such networks, or a combination of two or more of such networks). The user computing devices 102 can include fixed computing devices (e.g., computers) and/or mobile computing devices (e.g., smartphones, tablets, laptops, virtual assistance systems (e.g., ECHO, HOME- POD, GOOGLE HOME, etc.), smartwatch, smart-glasses, car computing system and/or navigation systems, televisions, smart hub and/or smart-home devices (e.g., smart-refrigerator, smart-stovetop, smart-oven, etc.), other such computing devices, or a combination of two or more of such devices). These user computing devices 102 include an audio system and/or are communicatively coupled with an audio system configured to capture at least speech utterances from the respective one or more users.

The item identifier system 100 further includes one or more model training servers 106 and/or systems, and one or more databases 108 (e.g., inventory database 108a, purchase history database 108b, customer database, customer profile database, supplier information database, machine learning model training data database, trained machine learning model repository, and the like). The user computing devices 102 include memory that store information and/or one or more databases, and/or accesses via the one or more communication networks 104 one or more databases 108 of the item identifier system 100 and/or external to the item identifier system. In some embodiments, the item identifier system 100 includes and/or is communicatively coupled with one or more e-commerce servers 112 and/or systems enabling the access to product information and/or coordinates a user's ability to access product information for sale by one or more retail entities. As one non-limiting example, the e-commerce server 112, in some embodiments, maintains and provides access to one or more websites that provide product information and/or enable shopping for one or more products from one or more retail entities.

Similarly, in some embodiments, the item identifier system 100 includes one or more point of sale systems 114, accessible over one or more of the distributed communication networks 104, and enabling the completion of sales of one or more products (e.g., through credit cards, debit cards, gift cards, virtual and/or mobile transfers or payment (e.g., VENMO, APPLE PAY, GOOGLE PAY, etc.), other such payment methods, and/or a combination of two or more of such payment methods. One or more inventory systems 116 are typically included in the item identifier system 100. The inventory system 116, in some embodiments, tracks inventory and maintains one or more inventory databases 108a of continuously varying inventory information (e.g., inventory counts or quantities at one or more retail facilities, inventory shipments, inventory demand, product pricing, other such inventory information, and typically a combination of two or more of such information). The inventory database 108a is typically accessible over one or more of the distributed communication networks 104 (e.g., accessible by the E-commerce server 112, inventory system 116, point of sale systems 114, and/or other systems of the item identifier system 100 and/or other systems external to the item identifier system).

Some embodiments include one or more product distribution systems 120 that manage, control and/or implement the distribution of products between retail facilities and/or customers. As one non-limiting example, the distribution system 120 receives shipping orders from retail stores and/or fulfillment centers, and manages and controls the transportation and delivery of products to the retail stores and/or fulfillment centers (e.g., from one or more distribution warehouses, harbors, train depots, etc.). As another non-limiting example, one or more of the distribution systems 120 manages and controls the transportation and delivery of products to customers (e.g., individual households, businesses, secondary markets, etc.) from one or more of the retail stores, fulfillment centers, warehouses, etc. The product distribution system 120, in some embodiments, includes and/or is communication with shipping systems (e.g., trucks, cars, planes, trains, unmanned vehicles, etc.) and/or in communication with third party delivery systems, companies and/or individuals. Typically, the distribution systems 120 are in communication over one or more of the distributed communication networks 104 with the e-commerce server 112, inventory system 116, point of sale system 114 and/or user computing devices to receive information about inventory, orders to be fulfilled, order deliveries, and/or other such information.

Based on the utterances, the item identifier system 100 is configured to identify one or typically multiple different product identifying entities within an utterance. Based on the identification, the item identifiers system 100, in some embodiments, further enables the ordering and/or purchasing of one or more of the products. In some embodiments, the user computing devices 102 respectively process the speech utterances and locally identify the relevant product identifying entities. In other embodiments, the user computing devices 102 communication with one or more separate systems to perform some or all of the processing and/or identification of product entities.

Figure 2:
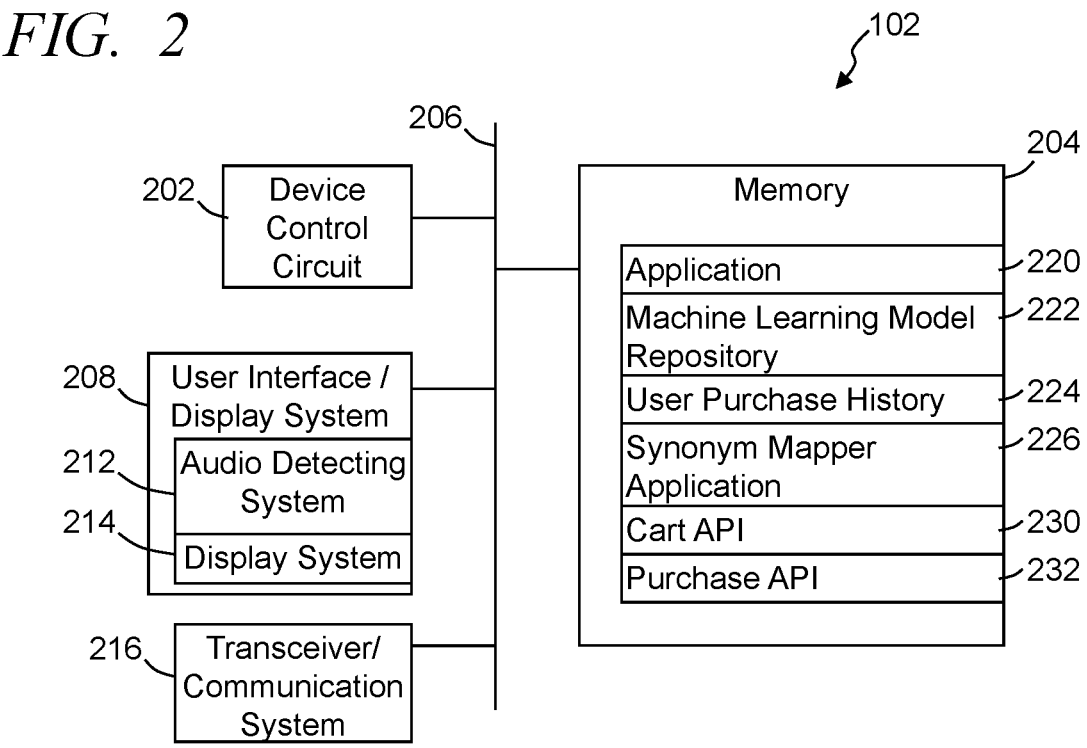
FIG. 2 illustrates a simplified block diagram of an exemplary user computing device, in accordance with some embodiments.

FIG. 2 illustrates a simplified block diagram of an exemplary user computing device 102, in accordance with some embodiments. The user computing device 102 includes a device control circuit 202 communicatively coupled with one or more memory 204 over one or more internal communication networks 206, links, paths, buses, other such communication systems or a combination of two or more of such communication systems. The device control circuit 202 can be implemented through one or more processors, microprocessors, multiprocessors, central processing unit, logic, local digital storage, firmware, software, and/or other control hardware and/or software, and may be used to execute or assist in implementing one or more machine learning models, controlling the operation of the user computing device 102, executing steps of the processes, methods, functionality and techniques described herein, control various communications, decisions, programs, content, listings, services, interfaces, logging, reporting, other such functionality, and typically a combination of two or more of such functionality. Further, in some embodiments, the device control circuit 202 can be part of control circuitry and/or a control system, which may be implemented through one or more processors with access to one or more memory 204 that can store instructions, code and the like that is implemented by the device control circuit 202 and/or processors to implement intended functionality.

In some embodiments, the user computing device 102 includes one or more user interfaces 208, and/or one or more internal and/or external power sources or supplies. The user interface 208 enables a user to interact with the user computing device 102 and receive information through the user computing device 102. In some instances, the user interface 208 includes a display system and/or one or more user inputs, such as buttons, touch screen, track ball, keyboard, mouse, etc., which can be part of or wired or wirelessly coupled with the user computing device 102. Further, the user interface includes and/or communicatively couples with an audio detecting system 212 of the user computing device configured to at least capture audio input. As described above, the user interface 208 may include other interface systems such as but not limited to one or more display systems 214, audio output systems, keyboards, touch screens, other such interface systems, and typically a combination of two or more of such systems.

The user computing device 102 further includes one or more communication interfaces, ports, transceivers 216 and the like allowing the user computing device 102 to communicate over one or more of the distributed communication networks 104, other networks or communication channels with other devices and/or other such communications or combination of two or more of such communication methods. Further the transceiver 216 can be configured for wired, wireless, optical, fiber optical cable, satellite, other such communication configurations or one or more combinations of two or more of such communications. Some embodiments include one or more input/output (I/O) ports that allow one or more external devices to couple with the user computing device 102. The I/O ports allow wired and/or wireless communication coupling and can be substantially any relevant port or combinations of ports, such as but not limited to USB, Ethernet, or other such ports (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

The memory 204 is accessed by the device control circuit 202, and typically includes one or more processor-readable and/or computer-readable media accessed by at least the device control circuit 202. Further, the memory 204 can include volatile and/or nonvolatile media, such as RAM, ROM, EEPROM, flash memory and/or other memory technology. Further, the memory 204 can be internal, external or a combination of internal and external memory, and/or some or all of the memory 204 can be part of the device control circuit 202. The memory 204 typically stores an executable code and data, including one or more application program interfaces and/or applications 220 that are executable by the device control circuit 202 to enable the user computing device to receive and process speech utterances.

In some embodiments, the memory stores one or more machine learning model storage, databases and/or repositories 222 accessed by configured to be applied by the one or more device control circuit 202. The machine learning model repository 222 stores and/or maintains a set of machine learning models to process utterances captured by the audio detection system 212. In some implementations, the memory 204 includes a user purchase history 224 maintaining at least some information corresponding to prior products purchased by the user, and typically purchased by the user from and/or in association with one or more retail entities.

The device control circuit 202, in some embodiments, when executing the application 220 is configured to receive one or more audio utterance of a request from a user. Typically, the utterance is received through the audio detecting system 212. In other instances, however, the utterance may be received over one of the distributed communication networks 104 a remote audio detecting system, another user computing device 102, a kiosk in a retail facility, and/or other source. The utterance, in some embodiments, includes a series of request words captured from the audible utterance. As simple, non-limiting examples, the utterance may be similar to "broccoli coffee pineapple ice cream chips freshly made tortillas," "four mac and cheese two pounds of oranges shredded mozzarella," "double pack of ketchup mustard large red cups," and other such utterances. The number of request words is unlimited, while in some implementations optimal performance is achieved when the number of request words is less than 50, and in some instances improved performance is achieved when there is less than 15 request words.

When utterances include multiple different items, references, products and/or things, it is common that a user does not recite a delimiter that separates different products in an utterance. In the first exemplary utterance above, the utterance includes potentially six (6) different products (e.g., "broccoli", "coffee", "pineapple", ice cream", "chips" and "freshly made tortillas"), or 5 different products (e.g., "broccoli", "coffee", "pineapple ice cream", "chips" and "freshly made tortillas"). In the second above exemplary utterance includes three different products (e.g., "four mac and cheese", "two pounds of oranges", and "shredded mozzarella"). The third above exemplary utterance includes three different products (e.g., "double pack of ketchup", "mustard" and "large red cups"). As described above, other speech recognition systems are typically incapable of effectively distinguishing between such items.

The item identifier system 100, however, enables a user to provide an utterance with numerous words that is intended to include multiple different products, items or the like, and to accurately identify the intended separate products, items or the like, and does so even when delimiters (e.g., commons, periods, semicolons, returns, hard returns, etc.) are not included or only partially included. In some embodiments, in part, the speech recognition is performed through the item identifier system 100 applying one or more machine learning models. For example, one or more machine learning models can be applied that featurize the search words, and one or more machine learning and/or neural network models apply an encoder-decoder architecture to identify relative positional relationships between at least some of the words in identifying the intended separate products, items or the like. The recognition is further enhanced, in some embodiments, by applying an evaluation of identified product entities to historic products and/or previously purchased products.

Figure 3:
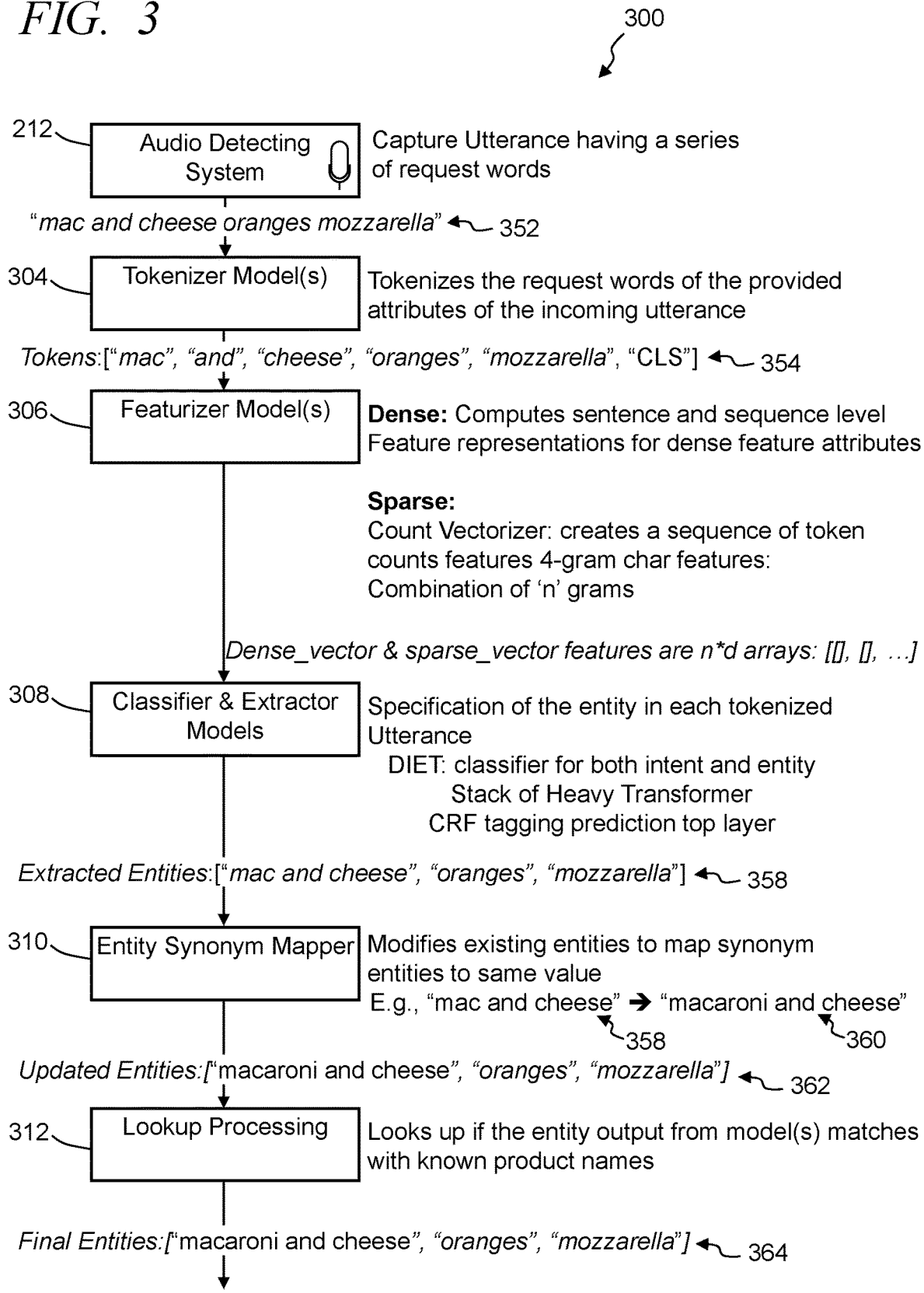
FIG. 3 illustrates a simplified system block diagram of an exemplary retail product ordering system that identifies a listing of determined product identifiers from a user utterance, in accordance with some embodiments.

FIG. 3 illustrates a simplified system block diagram of an exemplary retail product ordering system 300 that identifies a listing of determined product identifiers from a user utterance, in accordance with some embodiments. In some implementations, some or all of the retail product ordering system 300 is implemented on a single user computing device 102, while in other embodiments, some of the retail product ordering system 300 is implemented through one or more remote systems.

Referring to FIGS. 1-3, the product ordering system 300 receives an audio utterance of a request from a user. Typically, the utterance is captured by the audio detecting system 212 of the user computing device 102 associated with the user. The utterances can include a string of individual words, a sentence, multiple sentences, and/or other such utterances. Further, the utterance typically includes a series of request words that are to be captured from the audible utterance. In some embodiments, the audio detecting system and/or the user computing device includes one or more speech Automated Speech Recognition (ASR) systems or other such speech-to-text systems, which are common in many user computing devices and/or portable computing devices (e.g., GOOGLE, APPLE, etc.). In some instances, the ASR is at least partially implemented by a remote device via communication of one or more of the distributed communication networks 104, which returns the corresponding text. As described above, such ASR systems do not produce punctuations, symbols or other delimiters other than simply a space between recognized words when translating voice into text. This significantly increases the challenge to identify words that should be associated or otherwise grouped, and to separate adjacent product names. For example, an utterance may include "mac and cheese oranges mozzarella." The captured text would typically include the set of request words 352, in this example "mac and cheese oranges mozzarella." The request words 352 would typically be separated based on respective pauses within the respective utterance and the series of request words would typically not include other delimiters provided in the utterance separating the request words, unless otherwise expressly recited by the user.

In some embodiments, the product ordering system 300 includes one or more tokenizer models 304. The one or more tokenizer models 304, in some implementations, are trained based on known training sets of utterance words each comprising sets of multiple words. These training utterances can be substantially any relevant set of words, and typically are a combination of two or more known product identifying entities. Further, the training utterances typically include utterances with multiple request words and two or more of the known product identifying entities include multiple words corresponding to a single product. Similarly, the training utterance words can include other conditional words, such as but not limited to description terms (e.g., color, size, shape, flavor, cold, hot, etc.), number (e.g., quantity, size, dimension, etc.), measure (e.g., weight (e.g., pounds (lbs.), grams (g), ounces (oz), etc.), volume (e.g., ounces (oz), milliliters (ml), etc.), length (e.g., inches (in), centimeters (cm), meters (m), etc.), and/or other such measures), and other such conditional words that are to be associated with one or more product identifying words. Typically, the one or more tokenizer models are trained based on tens of thousands to millions of different known sets of training utterance words obtained from historic utterances, product identifiers of known products in inventory, known variations of product identifiers, and/or other such utterances.

The application of one or more of the tokenizer models 304 to the series of request words 352 results in a set of individual tokenized search words 354 or terms that correspond to the request words from the respective utterance. As a non-limiting example, when one or more of the tokenizer models are applied to the "mac and cheese oranges mozzarella" utterance, a the resulting a set of individual search words may be obtained comprising tokens: ["mac", "and", "cheese", "oranges", "mozzarella"]. Some embodiments incorporate an additional classification token (e.g., "CLS") in relation to intent classification, which in some implementations is inserted at the end of the utterance and/or the tokenized set of individual search words (e.g., tokens: ["mac", "and", "cheese", "oranges", "mozzarella", "CLS"].

In some embodiments, one or more or a series of featurizer models 306 are applied to the request words and/or the tokenized set of individual search words when the utterance is tokenized. The series of featurizer models 306 are trained based on sets of predefined product identifiers or names wherein each of a plurality of the sets of the predefined product identifiers comprises multiple predefined identifier words corresponding to a single product of multiple different products sold by a retail entity. In some embodiments the series of featurizer models 306 comprise feed-forward layers having one or more feed-forward neural networks and/or other models. At least some of the tokenized search words are each featurized with sparse features and/or dense features, and puts the individual search words or combination of search words into vector space, and/or otherwise identifies features that distinguish one term from another.

The vectorized features are used in one or more classifier and extractor machine learning models 308 in performing intent classification and name entity recognition (NER) and to generate multiple requested product entities based on identified position relationships between at least some of the search words. In some embodiments, one or more of the classifier and extractor models 308 is implemented through an entity transformer (ET) encoder-decoder architecture. The one or more classifier and extractor models 308 are trained based on the sets of predefined product identifiers comprising multiple product terms each having position labels that are configured to identify a corresponding position relationship with one or more other terms when the respective predefined product identifier includes multiple words. Through the training the classifier and extractor model 308 predicts positional relationships between terms of multi-term product identifier or name.

Based on the features of the search words, the one or more classifier and extractor models 308 generate and/or extract the multiple requested product entities 358 for a respective utterance. The requested product entities are predicted to correspond to respective products specified by the user within the string of request words in the utterance. Typically, at least a set of a plurality of the multiple requested product entities 358 each comprise a respective sub-set of the position labeled product terms ordered in accordance with the corresponding position label dictating a position of the respective position labeled product term relative to the other one or more of the product terms of that respective sub-set of the position labeled product terms of the respective requested product entity.

In some embodiments, for example, some position labels include a beginning (B) or start position label that is associated with a product term as a beginning term when a product term is a first term of the multi-term product identifier (e.g., the term "large" being associated with the beginning (B) position label when the multi-term product identifier is "large red plastic cups"). Similarly, some embodiments include a last (L) position label that is associated with the product term being considered that is a final or last term of the multi-term product identifier (e.g., the term "cups" being associated with the last (L) position label when the multi-term product identifier is "large red plastic cups"). Some embodiments further utilize an intermediate (I) position label that is associated with terms that are between the begging term and the last term (e.g., each of terms "red" and "plastic" being associated with the intermediate (I) position label when the multi-term product identifier is "large red plastic cups"). Other embodiments may additionally or alternatively include additional or other position labels with multi-term product identifiers, such as but not limited further positional information when there are multiple intermediate terms. Accordingly, the position labels, in some embodiments, provide a positional relationship of a term to other terms of a multi-word product identifier. Still further, in some embodiments, utilize an unassociated (U) position label to be associated with single term product identifiers, where single term product identifiers comprise a single term unassociated with another one of the search words. Continuing the example above and illustrated in FIG. 3, the classifier and extractor model 308 identifies the relationship between terms "mac", "and", and "cheese", and predicts position labels for "mac" with label "B", "and" with label "I", and "cheese" with label "L". Based on the predicted positions, the requested product entities 358 in this example are determined as "mac and cheese", "oranges" and "mozzarella."

In some embodiments, the product ordering system 300 includes an entity synonym mapper 310 that is applied to one or more of the identified requested product entities 358 to identify potential synonyms. The synonyms may correspond to a producer or manufacturer's naming, a more commonly used product name, a more generic entity, a more specific entity, and/or other such types of synonyms. The entity synonym mapper 310, in some embodiments, access and/or includes one or more databases, tables, machine learning models and/or other relevant systems to maintain and identify correlations between synonyms and/or learned synonyms. Further, in some embodiments, the entity synonym mapper 310 is implemented through a synonym mapper application 226 executed by the device control circuit 202 of a respective user device 102. The synonym mapper application 226, when executed, is configured to enable the identification of one or more synonymous requested product entities 360 corresponding to each of one or more of the requested product entities 358 of the set of multiple requested product entities.

The synonyms can be substantially any relevant synonyms for products, such as but not limited to different pronunciations, different orders of words, abbreviations, acronyms, nick-names, truncations, different names, name brands, include manufacturer names, other such variations, or a combination of two or more of such variations. As a further non-limiting examples, the entity synonym mapper 310 may identify a synonym for "mac and cheese" as "macaroni and cheese", "coke" as COCA-COLA, "TV" as television, "NYC" as New York City, "PB and J" as "peanut butter and jelly", and other such synonyms.

Further, in some implementations, the entity synonym mapper 310 is updated over time as additional and/or alternative synonyms are determined, introduced, become more common and/or other such factors. In some embodiments, the device control circuit 202 implements the synonym mapper application that when executed utilizes one or more synonym tables and/or databases to identify one or more synonymous requested product entities 360 corresponding to one or more of the requested product entities 358 of the set of multiple requested product entities, and whether a synonymous requested product entities is to be used. Further, the execution of the synonym mapper application, in some embodiments, incorporates synonymous requested product entity 360 in the listing of updated requested product entities 362 and/or replaces an identified requested product entity 358 with the synonymous requested product entity 360 resulting in a listing of updated requested product entities 362, which some implementations can be ordered and/or presented through a graphical user interface of the user computing device.

In some embodiments, the entity synonym mapper 310 is customized relative to a particular user or set of users (e.g., a family, friend group, geographic area, etc.) over time based purchase history and prior utterances to incorporate a synonym association between a particular utterance of a product entity and a specific product consistently purchased by the user or set of users. For example, a synonym association may be established over time based on an identification that when a particular user recites "coke", that the customer purchases a 12 pack of twelve oz cans of COCA-COLA. The association can result in a substitution of a requested product entity 358 of "coke" with the synonymous requested product entity 360 of "12 pack of twelve oz cans of COCA-COLA." As such, in some embodiments, the entity synonym mapper 310 itself or another application evaluates purchase histories to enable the customization of the product synonyms defined within the synonym table(s), database(s), matrix(ices), array(s), and/or other such correlations.

The retail product ordering system 300, in some embodiments, further includes one or more lookup processing confirmation application 312 executed by the device control circuit 202. The lookup processing operates at least in part to confirm the updated requested product entities 362 and/or requested product entities 358 correspond to actual products and/or products expected to be considered and/or purchased by the user submitting the utterance. The confirmation can include confirming a corresponding product has previously been purchased, a corresponding particular product in inventory of the retail entity is identified as equating to one of the requested product entities 358, a corresponding product is identified that has a threshold relationship with one of the requested product entities 358, confirming that a requested product entity 358 corresponds and/or has a threshold relationship with a product that has been purchased by a threshold number of users within a threshold period of time and accordingly is predicted to be the product of interest, and/or other such confirmations.

In some embodiments, the device control circuit in implementing the lookup processing accesses a purchase history database 108b of the user and/or other users that includes product information of products previously purchased. The purchase history database 108b can be locally stored on the user computing device and/or accessed, via the transceiver and over one or more of the communication networks. The lookup processing may additionally or alternatively access other databased, such as but not limited to an inventory database, supplier databases, third party databases, and/or other such databases and/or tables. In some embodiments, the lookup processing confirms an accuracy of each of the set multiple requested product entities 358 and/or updated requested product entities 362 relative to a purchase history associated with the user and/or other users, and generates a listing of determined product identifiers 364 comprising purchased product identifiers corresponding to the confirmed set of the multiple requested product entities. This confirmation further enhances the resulting listing of determined product identifiers to provide the determined product identifiers that are consistent with products that the user is more likely actually requesting. Similarly, in some embodiments, the listing of determined product identifiers 364 corresponds to specific products that the customer has previously purchased and is thus predicted to be the product for which the user is actually searching and/or intends to purchase. Based on the purchase history, some embodiments identify for one or more of the sets of multiple requested product entities 358 a corresponding purchased product identifier. The listing of the determined product identifiers can, in some embodiments, be generated to include the purchased product identifiers as an updated requested product entity in place of and/or accompanying the corresponding requested product entity 358.

For example, with the updated set of multiple requested product entities 362 of "macaroni and cheese", "oranges", "mozzarella", the lookup processing confirmation application 312, in some embodiments, may provide a final listing that includes actual and/or purchased product identifiers of: "14.5 oz Kraft Macaroni & Cheese", "2 lbs. Organic Navel Oranges", and "16 oz Great Value Shredded Mozzarella Cheese, Low-Moisture Part-Skim", which correspond to actual products previously purchased by the specific user, a most common actual product purchased by multiple users that corresponds to the respective requested product entities 358, an actual product being emphasized that corresponds to the respective requested product entities 358, other such relationships, or a combination of two or more of such relationships. For example, in identifying a common actual product purchased by a set of multiple users, the lookup processing confirmation application 312 may utilize purchase history data associated with one or more other customers that have a relationship and/or one or more threshold correlations with one or more customer profile characteristics to those of the user submitting the utterance (e.g., within a threshold geographic location, within a threshold expense purchase history, within a threshold of types of products purchased, within one or more threshold quantities of products purchased, other such relationships or a combination of two or more of such relationships). Some embodiments prevent unconfirmed product from being included in the listing of determined product identifiers 364. The device control circuit 202, in response to determining that a particular requested product entity is not confirmed (e.g., has not previously been purchased), can prevent the particular requested product entity and/or a corresponding purchased product identifier from being included in the listing of the determined product identifiers.

Some embodiments further enhance the product recognition in part by identifying product categories, groups and/or one or more individual products associated with one or more requested product entities 358 that were not confirmed as previously purchased products and/or not are not otherwise confirmed identified products. One or more of such identified categories, groups and/or individual products that were not confirmed as previously purchased, in some implementations, can be incorporated into the listing of determined product identifiers 364. Additionally or alternatively, one or more of such identified categories, groups and/or individual products that were not confirmed can be incorporated into one or more separate listings. In some embodiments, in response to one or more requested product entities 358 not being confirmed, the device control circuit 202 can access a product inventory database corresponding to the retail entity, identifies a category of recommended products corresponding to one of the requested product entities 358 that was not confirmed as purchased or otherwise confirmed. One or more additional recommendation listings can be generated that include a corresponding category of recommended products, group of recommended products and/or one or more recommended products. The device control circuit can further control the display system of the user computing device 102 to render the recommendation listing. For example, the displayed recommendation listing can include a category of recommended products and a selectable option that is configured to cause, in response to selection of the selectable option by the user, product information to be displayed for each one or more products associated with the recommended category and corresponding to the unconfirmed requested product entity.

Some embodiments further utilize the listing of determined product identifiers 364 to simplify shopping and/or ordering of products. In some instances, for example, the device control circuit 202 utilizes the listing of determined product identifiers 364 to control a display system 214 of the user computing device 102 to render through a graphical user interface the listing of determined product identifiers, which may include product images, other information about the products, options corresponding to the product (e.g., varying sizes of the product, varying flavors of the product, and/or other such options), links to additional information, cost information, identifier number (e.g., bar code number, SKU, etc.), other such information, or a combination of two or more of such information. Similarly some embodiments enable the user to select one or more and/or all of the products to be added to a cart and purchase, for example, through cooperative communication from the user computing device 102 with the e-commerce server 112, one or more point of sale systems 114, the inventory system 116, and/or other such systems of the item identifier system 100 and/or systems external to the item identifier system 100.

Figure 4:
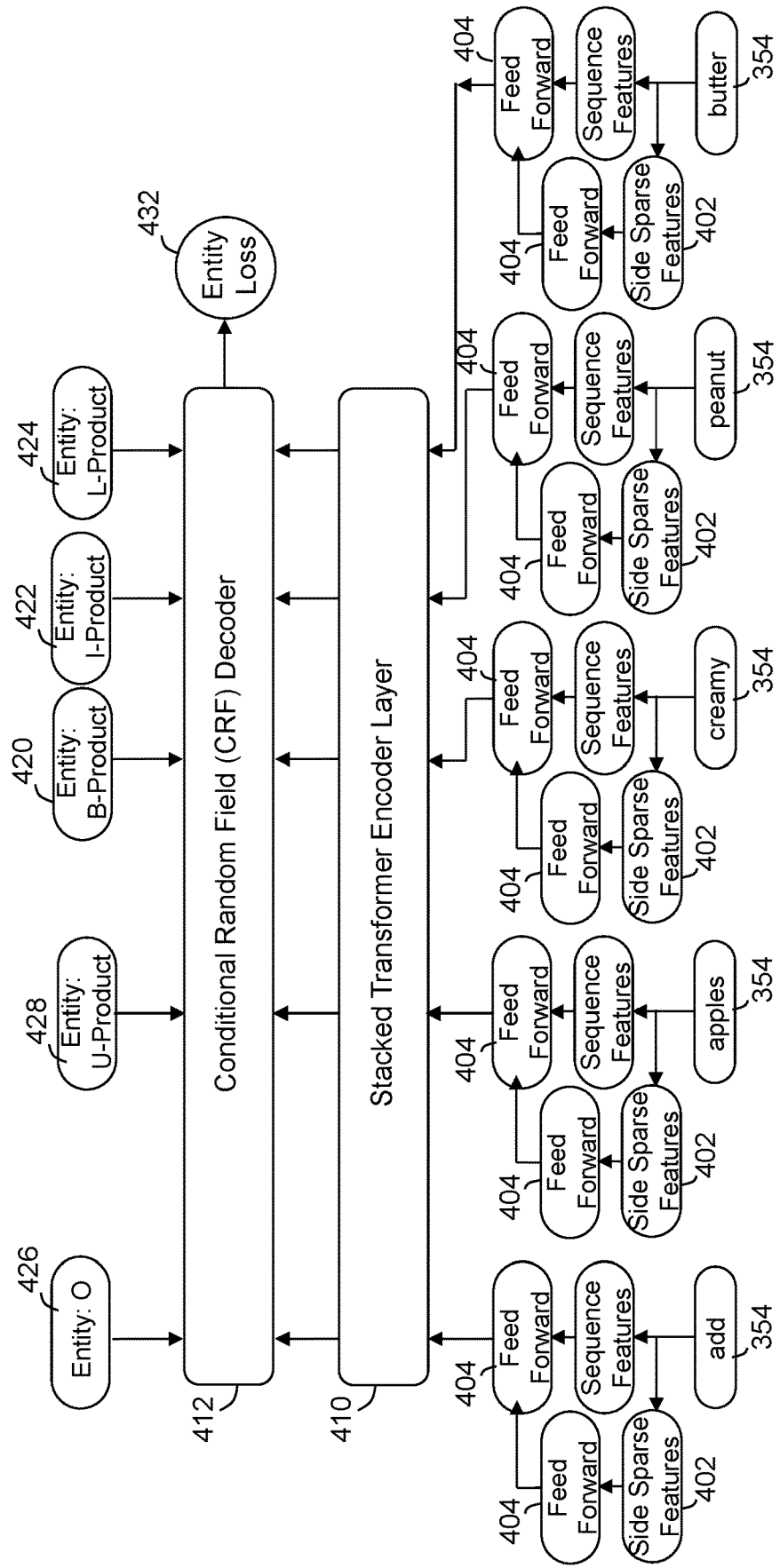
FIG. 4 illustrates a simplified block diagram of an exemplary representation of the one or more featurizer models in cooperation with one or more classifier and extractor models 308, in accordance with some embodiments.

FIG. 4 illustrates a simplified block diagram of an exemplary representation of the one or more featurizer models 306 in cooperation with one or more classifier and extractor models 308, in accordance with some embodiments. The one or more featurizer models 306, in some embodiments, includes sets of multiple cooperatively operating machine learning models and/or neural networks 402, 404. These models enable the use of dense (sequence) features extracted from language models (e.g., conveRT models, BERT models, Roberta models, other such models or a combination of two or more of such models), and sparse features to be identified which comprise word embeddings and multi-hot character embeddings. The features can be fed to one or more point wise feedforward layers. In some embodiments, the feedforward layers comprise feedforward neural networks 404 that puts the search words 354 or combinations of such search words into vector space. In some implementations, the neural networks implement known techniques to vectorize the search words.

In some embodiments, the sparse features are token level one-hot encodings and/or multi-hot encodings of character n-grams (e.g., $n \le 10$, $n \le 7$, $n \le 5$, or other such limit depending on implementation). Character n-grams typically contain redundant information. As such, some embodiments attempt to limit or avoid overfitting by applying dropout to these sparse features. Dense features can be pre-trained word embeddings (e.g., ConveRT, BERT, GloVe, etc.). Some embodiments in utilizing ConveRT, which is typically trained as a sentence encoder, set an initial embedding for a _CLS_ token as the sentence encoding of the input obtained from ConveRT. This can add extra contextual information for a complete utterance in addition to information from individual word embeddings. Additionally or alternatively, some embodiments in applying pre-trained BERT, an initial embedding is set to the corresponding output embedding of the BERT [CLS] token, and for GloVe to a mean of the embeddings of the tokens in training utterances. Sparse features can be passed, in some implementations, through a fully connected layer with shared weights across sequence steps to match the dimension of the dense features. The output of the connected layer is concatenated with the dense features from pre-trained models.

The sparse features can be passed, in some implementations, to the feed-forward layer, which in some applications is a fully connected layer. Further, weights of the connected layers can be shared through the input sequence. In some instances, the weights are shared across sequence steps to match the dimension of the dense features. The feedforward neural network (FNN) layer output of the sparse features and dense sequence features can be concatenated before passing to one or more transformer encoder layers 410, which in some embodiments is part of the classifier and extractor models 308.

The product ordering system 300, in some embodiments, further improves speech recognition, in part, through an incorporation of pre-trained word embeddings from language models and combines these with sparse word and character level n-gram features in a plug-and-play fashion. Some embodiments use sparse representations like word level one-hot encodings and character level n-grams along with dense representations transferred from large pre-trained language models to enhance at least the vectorization that enables improved identification, classification, and/or positional relationships of the search words 354.

The one or more transformer encoder layer models 410 encode the input sequences of search words into vector space. Some embodiments apply one or more stacked transformers encoder layer models (e.g., N≤10, N≤6, or other relevant stack) with relative position attention. In some implementations, the transformer encoder layer comprise multi-headed attention layers and point wise feed forward layers. These sub-layers produce an output of dimension $d_{model}$, which can be dependent on one or more factors. For example, in some instances the sub-layers produce an output of dimension $d_{model}$=256, where a number of attention heads can be $N_{heads}$=4, a number of units in a transformer can be S=256, with a number of transformer layers L=2. Other configurations can be implemented as would be appreciated by those skilled in the art to achieve the intended dimensions and/or output.

As described above, the classifier and extractor models 308 operate with relative position attention. Based on the relative position, the classifier and extractor models 308 maps the input sequence of the request words 352 to a sequence of continuous representations. The classifier and extractor models 308, in some embodiments, additionally include one or more decoder models 412 for named entity recognition. In some embodiments, the one or more decoder models 412 comprise one or more conditional random field (CRF) decoder that jointly models the sequence of position labeling or tagging decisions of an input sequence. The conditional random field model, in some implementations, utilizes the vectorized search words to define the respective positional labels defining respective search words as an individual word product or part of a multi-word product. In some embodiments, the classifier and extractor model is configured to identify for each of the search words 354 whether the respective search word is considered an individual word or is to be positionally associated with one or more of the other search words as one set of the sets of predefined product identifiers. For those search words determined to be associated with one or more of the other search words, the classifier and extractor models 308 identifies the respective one of the multiple position labels that define the association with the associated one or more other search words.

In some embodiments, the classifier and extractor models 308 identifies applies a "BILOU" labeling scheme (B (Begin) label 420 indicates a first token of an entity; I (Intermediate, or Inside) label 422 indicates a part of the entity; L (Last (or E—End)) label 424 indicates last token of the entity; O (Outside) label 426 identifies tokens outside of named entities and/or identified as not part of an entity; and U (Unit (or S—Single)) label 428 indicates a single token entity). As a further example, with an utterance of "add apples creamy peanut butter", the tokenizer model 304 detects tokenized search words 354 of "add", "apple", "creamy", "peanut", and "butter". The featurizer models 306 vectorize the search words and the classifier and extractor models 308 identify position labels relative to the search terms (e.g., "add" labeled with an "O" label 426 as be outside of an entity, "apple" labeled with a "U" label 428 as being a single token entity, "creamy" labeled with a "B" label 420 as a beginning term of a multi-term entity, "peanut" labeled with an "I" label 422 as an intermediate word, and "butter" labeled with an "L" label 424 as an last token entity of the multi-word product identifier entity.

As a non-limiting example, some embodiments in performing named entity recognition, predict sequences of entity labels entity through the conditional random field (CRF) labeling layer on top of the transformer output sequence a corresponding to the input sequence of tokenized search words 354, where $L_E$=$L_{CRF}$(a, $y_{entity}$), where $L_{CRF}$(.) denotes log-likelihood for a CRF. With intent classification, in some embodiments the intent classification utilizes a transformer output for _CLS_ token $a_{CLS}$ and intent labels $y_{intent}$ are embedded into a single semantic vector space $h_{CLS}$=E(aCLS), $h_{intent}$=E($y_{intent}$), where h∈$R^{20}$. Some embodiments further use a dot-product loss in attempts to maximize similarity $S_I^+$=$h^T_{CLS}h^+_{intent}$ with the target label $y^+_{intent}$ and minimize similarities $S_I^-$=$h^T_{CLS}h^-_{intent}$ with negative samples $y^-_{intent}$, where $$L_I = -\langle S_I^+ - \log(e^{S_I^+} + \Sigma_{\Omega_I^-} e^{S_I^-}) \rangle$$

where the sum is taken over the set of negative samples $\Omega_I^-$I and the average $\langle . \rangle$ is taken over some or all of the examples. Further, some embodiments apply a dot-product similarity to serve as a ranking over possible intent labels. Some embodiments apply additional training objective to predict randomly masked input tokens. As such, some embodiments provide apply a stack of transformer encoder layers and point wise feed forward layers with relative position attention that maps an input sequence of the request words to a sequence of continuous representations. The conditional random field decoder model 412 produces a sequence of entity position labels defining the position of the product terms within the respective sub-set of the position labeled product terms of the respective requested product entity.

Typically, the classifier and extractor models 308 additionally identifies entity losses 432. The losses can include, for example, incorrect identification of entities, which typically used as feedback and subsequent training of the models. In some embodiments, the machine learning models apply one or more loss functions that are implemented to try and minimize errors or losses in optimizing the respective model operations. The loss functions can, in some applications, result in adjustments in the weightings within the neural networks in attempts to reduce incorrect identifications and/or term labeling. Some embodiments employ systems similar to that described in "A Sequence to Sequence Model for Extracting Multiple Product Name Entities from Dialog" by Gubbala et al. (arXiv:2110.14843, Oct. 28, 2021), and/or "DIET: Lightweight Language Understanding for Dialogue Systems" by Bunk et al. (arXiv: 2004.09936, May 1, 2020), which are incorporated herein by reference in their entirety. By applying the multi-model framework and the position labeling the present embodiments provide improved speech recognition systems developed using end-to-end deep learning machine models. Additionally, the product ordering system 300 additionally enhances the recognition by applying the entity synonym mapper 310 to broaden the identification of products and simplify the classification of sets search terms to common product identifiers. Some embodiments further enhance the accuracy of product identification through the lookup processing confirmation application 312 that, in some embodiments, applies a filtering to the requested product entities 358 and/or the updated requested product entities 362. This lookup processing confirmation application 312 additionally enables the identification of products not associated with a product previously purchased by a customer and enables the product ordering system 300 to provide additional information and/or access to information about one or more relevant products corresponding to the identified product that was not previously purchased.

Figure 5:
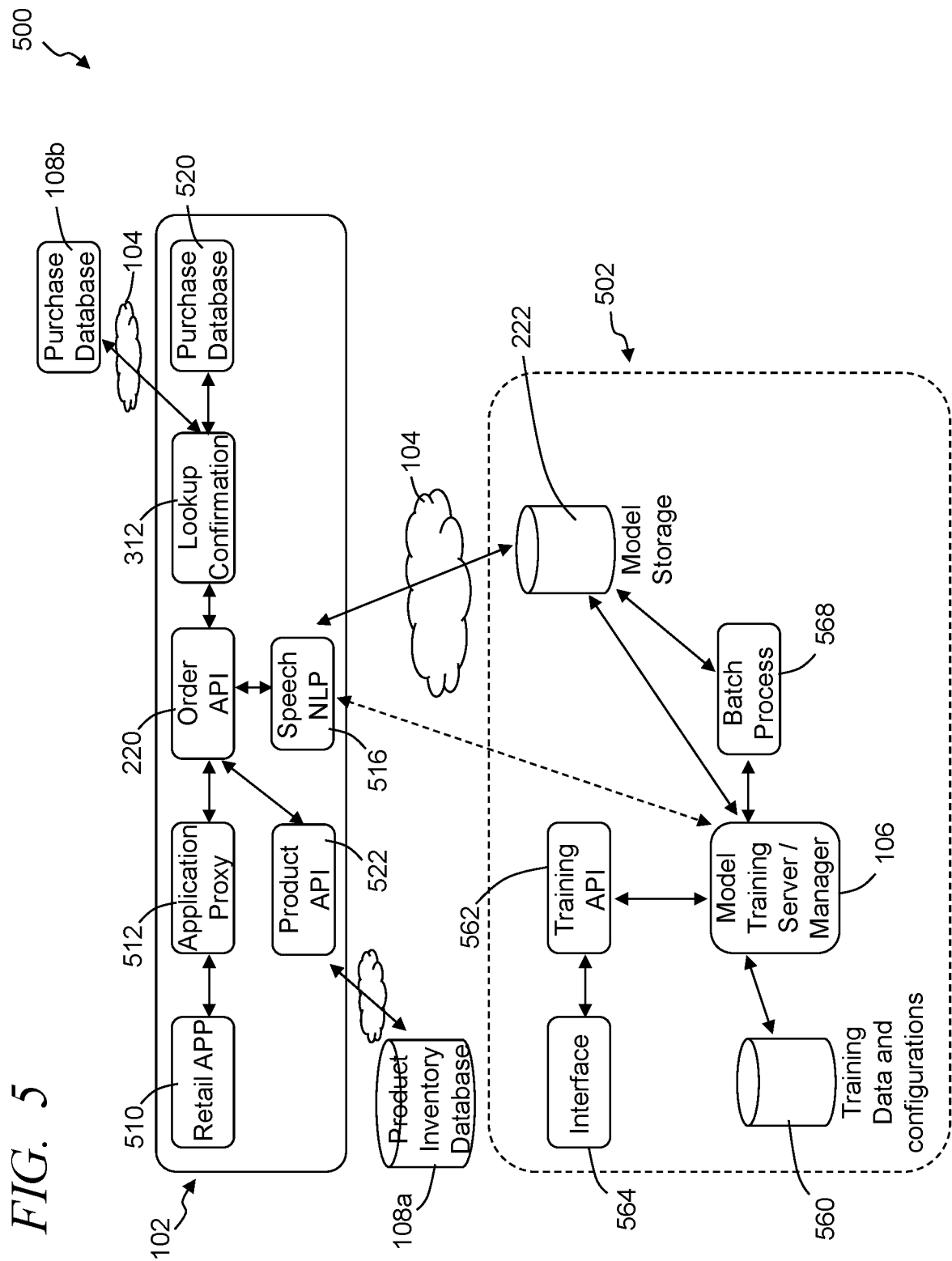
FIG. 5 illustrates a simplified block diagram of an exemplary voice ordering system, in accordance with some embodiments.

FIG. 5 illustrates a simplified block diagram of an exemplary voice ordering system 500, in accordance with some embodiments. The voice ordering system 500 includes numerous user computing devices 102 (represented by a single user computing device for simplicity), and a model training system 502. The user computing devices 102 are configured to communicatively couple, at least temporarily, with the model training system 502 to at least receive trained models, and typically updated trained models of at least featurizer model(s) 306, the classifier and extractor models 308, and when relevant the tokenizer model 304 from one or more of the machine learning model storage and/or databases 222. The model repository 222 can be implemented through substantially any relevant memory, and is typically implemented through multiple memory systems that are geographically distributed and communicatively coupled with one or more of the communication networks 104 enabling distributed storage needs, simplified access, improved speed of access, redundancy and enhanced security.

The user computing device 102 includes, in some embodiments, a retail application (APP) 510 that is configured to control a graphical user interface that is displayed through a display system of the user computing device. The retail APP 510 enables a user to interact through the graphical user interface to utilize services available through the retail APP, such as one or more of speech recognition of products, shopping for retail products, scheduling and/or coordinating deliveries, tracking deliveries, and/or other such services. The retail APP 510 receives the utterance from a microphone or other audio detection system 212 on the user computing device. In some instances, the retail APP includes a speech to text component that converts the utterance to text or other relevant format for subsequent processing. In some embodiments, the retail APP provides a selectable option that when activated by the user activated the audio detection system and initiates the capturing of the speech utterance.

In response to receiving the utterance and/or a request to initiate vocal ordering, the retail APP 510 communicates or available the request words 352 from the utterance to an application proxy 512, which in some embodiments is implemented through an AKS Cluster (Azure Kubernetes Service). The application proxy 512 identifies that the request and/or request words 352 are to be routed to go to an order application and/or application program interface (API) 220, and forwards the request words. The API 220 activates a speech natural language processing (NLP) application 516 that implements one or more of the trained tokenizer model(s) 304, the trained featurizer model(s) 306, and the trained classifier and extractor model(s) 308 to extract the requested product entities 358 in accordance with the position labels. In some embodiments the API 220 and/or the application proxy 512 implement the entity synonym mapper 310 to determine whether there are defined synonyms and when relevant replaces one or more product identifying entities 358 with a corresponding synonymous requested product entity 360 and providing the updated requested product entities 362.

Further, the lookup processing confirmation application 312, which in some instances is a separate application, while in other instances is implemented through the API 220, is further executed in the user computing device 102. The lookup processing confirmation application 312 access purchase history data to confirm the requested product entities 358 and/or updated requested product entities 362 correspond to actual products and/or products expected to be considered and/or purchased by the user submitting the utterance. The purchase history data may be stored in a local purchase history 520, a remote purchase history database 108b accessed over one or more of the communication networks 104, and/or a remote server (e.g., e-commerce server 112) accesses the remote purchase history database. In some instances, the local purchase history data 520 is updated over time based on the remote purchase history database and/or tracked by the device control circuit 202 based on purchases made through the retail APP 510.

The list of updated requested product entities 362 is returned, in some implementations, through the proxy 512, to the retail application 510 and used by the retail application to control the display system 214 of the user computing device 102 to present through a graphical user interface the listing of determined product identifiers 364. The listing can include additional information and/or provide one or more links to access additional information about the respective products, such as but not limited to images, descriptions, ingredients, nutritional information, and/or other such information.

In some embodiments, the updated requested product entities 362 and/or requested product entities 358 that are not confirmed in association with the purchase history are utilized by a product lookup API 522, implemented by the device control circuit 202, that accesses one or more product databases, such as but not limited to an inventory database 108a, in attempts to identify potential products, product categories and/or other such identifiers for those updated requested product entities 362 and/or requested product entities 358 that have not been identified as previously purchased. In some embodiments the product lookup API 522, in response to the identification that one or more requested product entities of the set of multiple requested product entities 358 and/or updated requested product entities have not previously been purchased, accesses the product inventory database 108a that correspond to one or more retail entities. The product lookup API 522 identifies one or more particular recommended products corresponding to a respective one of the unconfirmed product entities and/or one or more categories of recommended products corresponding to one or more of the unconfirmed requested product entities, and generates a recommendation listing comprising the particular recommended one or more products and/or the recommended categories of recommended products.

The retail APP 510, executed by the device control circuit, can control the display system of the user computing device to render the recommendation listing comprising more particular recommended products categories of recommended products. In some embodiments, the recommendation listing and/or the GUI includes a selectable option that is configured to cause, in response to selection of the selectable option by the user, product information to be displayed for the corresponding recommended product and/or for each of one or more products associated with the recommended category, which correspond to one or more of the unconfirmed requested product entities.

The model training system 502 includes one or more model training servers 106 or managers, which are implemented through one or more computing systems, servers, computers, processor and/or other such systems communicatively coupled with one or more of the distributed communication networks 104, and are configured to build and/or train the machine learning models. In some implementations, the model training server 106 includes multiple sub-model training systems each associated with one of the different machine learning models of the speech and item identifier system 100. The model training server 502 can be configured for substantially any relevant type of speech recognition. For example, when utilized in a retail environment the model training server 502 can be considered as a retail model training server associated with one or more retailers and/or the retail industry. Alternatively, the model training server can be configured to training models in other environments, such as but not limited to financial services, Internet searching, news services, product distribution, real estate, entertainment information, and other such environments.

The model training system further includes one or more training data databases 560 storing the training data to be used by one or more of the models of the item identifier system 100 and/or the retail product ordering system 300. The training data databases 560 can be local to the model training system 502, remote and accessible over one or more of the communication networks 104 or a combination of local and distributed. The model training server 106 uses the relevant machine learning data to train the tokenizer models 304, the featurizer models 306, and the classifier and extractor models 308.

Typically, the training data comprises custom data specific to the particular model and/or particular to an intended recognition. The training data, in some embodiments, includes training utterance data that can include thousands, hundreds of thousands or millions or more audio content comprising voice utterances of a string of words, text data, sets of text words, and the like. The utterance data can include phrases, sentences, names, terms, acronyms, strings of product identifier entities, other such data, and/or a combination of such data. In some embodiments, one or more of the modeling data can be augmented, such as with descriptor metadata, relevance metadata, position labels, and/or other such augmentation. Further, when the item identifier system 100 and/or the retail product ordering system 300 are used in identifying products, the training data comprises utterances and/or strings of text custom to a particular retail entity, such as but not limited to hundreds of thousands of audio recorded utterances and/or strings of text reciting products within the inventory and/or expected to be in the inventory of the retail entity. As introduced above, in many instances an utterance can include conditional words. Accordingly, many if not most of the training utterances and/or strings of terms include one or more conditional words with respect to one or more product words. In some embodiments, one or more training processes are similar to the process performed by one or more models after having been trained, but can be trained with multiple sets of training data (e.g., some real and some fictional for the sake of training). Predictions are compared to actuals to ensure that the set of models are collectively predicting entities with a certain threshold confidence.

In some embodiments, one or more or all of the models described herein are trained by going through the same or similar analysis as described for the execution of the respective model. The models are trained with multiple sets of data inputs corresponding to known and/or fictitious utterances and entities with and/or without manual feedback to fine tune the identification/similarity analysis and/or scoring/weighting. Once the models provide consistent analysis with a given confidence level, the trained models are saved for use by the system in real time. Occasionally, the models can be re-trained or training can be supplemented with additional training utterances and/or data sets and with feedback during real time usage and/or after usage. In some embodiments, collected and/or received event data are transformed into one or more formats to facilitate training of the models and/or neural networks. In some embodiments, the models and/or neural networks may be trained in one or more stages. Each stage may output a particular trained model. In some embodiments, a trained model may be further trained in a subsequent stage based on another data set as input.

The above description includes descriptions of embodiments implementing and/or utilizing trained machine learning models and/or neural networks. In some embodiments, the neural network, machine learning models and/or machine learning algorithms may include, but are not limited to, deep stacking networks (DSN), Tensor deep stacking networks, convolutional neural network, probabilistic neural network, autoencoder or Diabolo network, linear regression, support vector machine, Naïve Bayes, logistic regression, K-Nearest Neighbors (kNN), decision trees, random forest, gradient boosted decision trees (GBDT), K-Means Clustering, hierarchical clustering, DBSCAN clustering, principal component analysis (PCA), and/or other such models, networks and/or algorithms.

In some embodiments, the model training server 106 is further configured to train multiple different tokenizer models 304, featurizer models 306, and/or the classifier and extractor models 308 based on different sets of training data. Accordingly, the model training server 106 can provide customization for one or more of the tokenizer models 304, the featurizer models 306, and/or the classifier and extractor models 308 (e.g., for different geographic regions, different languages, different types of items being identified, different retail stores, different on-line retail platforms, different retail entities (typically associated with one or more retail stores or on-line retail platforms), different sets and/or types of users, other such differentiators, and/or a combination of two or more of such differentiators.

The model training server 106 stores the trained models in one or more machine learning model repositories 222. The machine learning model repositories 222 can be implemented through one or more storage systems, which in some instances are geographically distributed and communicatively coupled with one or more of the communication networks 104. One or more of the trained models (e.g., the tokenizer models 304, the featurizer models 306, and/or the classifier and extractor models 308) can be accessed by and/or communicated to the different user computing devices (e.g., millions or hundreds of millions of potential user computing devices) through the model repository 222 and/or in some instances directly from the model training server 106. In some embodiments, the tokenizer models 304, the featurizer models 306, and/or the classifier and extractor models 308 are locally stored at the respective user computing devices, and are replaced over time with updated and/or retrained models that are predicted to be more accurate, and/or more relevant to the user and/or user computing device. The most current and/or relevant trained, retrained and/or updated models, in some embodiments, are pushed to respective user computing devices. In some instances, user computing devices may check over time the relevant version of respective trained models and confirm through the model storage 222 and/or the model training server 106 that the version currently being used is the most current and/or relevant for that user and/or user computing device.

In some embodiments, the model training system 502 includes one or more training application program interfaces (API) 562 that enables managing users to access the model training servers 106 to control the training through one or more of the model training servers 106, manage the one or more model training servers 106, update and/or modify one or more of the model training servers 106, schedule training through one or more of the model training servers 106, access and/or update training data and/or configurations, schedule batch processing of training and/or communication of models, other such functionality, and typically a combination of two or more of such functionality. One or more user interfaces 564 are typically included with and/or communicatively coupled with the training API 562 to provide the users with methods of interacting through the API. Further, the model training system 502, in some embodiments, includes a batch processing system controller 566 that enables the implementation of batching the training of one or more models and/or the transfer of models, updated models and/or retrained models to one or more remote user computing devices.

Further, the one or more model training servers 106 are further configured to repeatedly retrain and/or update the models over time. This retraining can be based on updated and/or new training data. Additionally, this retraining and/or updating can include retraining and/or updating based on feedback from the numerous user computing devices 102, customer database and/or customer profile databases, purchase history data, and/or other relevant information. For example, the entity loss data from the classifier and extractor models 308 is typically used as feedback in retraining at least the classifier and extractor models over time. In some implementations, one or more of the machine learning models apply one or more loss functions that are implemented to try and minimize errors or losses in optimizing the respective model operations. The loss functions result in adjustments in, such as but not limited to, weightings within the neural networks in attempts to reduce incorrect identifications and/or term labeling.

In some embodiments, some or all of the utterance data and/or the resulting request words 352 received through user devices 102 are further used as at least part of the retraining and/or updating of one or more of the tokenizer models 304, feature models 306 and/or the classifier and extractor models 308. Additionally or alternatively, in some embodiments, separate sets of tokenizer training data are used for training the tokenizer models 304, separate sets of featurizer training data are used for training the featurizer models 306, separate sets of classifier and extractor training data are used for training the classifier and extractor models 308. As described above, the training of the classifier and extractor models 308 enhances the classifier and extractor models 308 accuracy in pattern recognition of associations between terms in order to subsequently identify the position labels ("B", "I", "L", "U", "O", etc.) when a set of multiple terms are identified to be grouped a single item. In some embodiments training of models can include the user of Adam optimizer with the initial learning rate of 0.001. Batch sizing can be increased throughout training progress as a source of regularization (e.g., from 64 to 256). Further, some or all of the ET models may be developed with Tensorflow.

The model training server 106, in some embodiments, configured to receive, over at least one of the one or more distributed communication networks 104, subsequent purchase information from numerous user computing devices 102 following audible utterances from respective users and the generation of the respective listings of determined product identifiers. This information enables the correlation between the resulting respective listing of determined product identifiers and those products that were actually purchased, and provides feedback regarding the accuracy of the generated respective listings of determined product identifiers. Accordingly, the model training server can identify product differences between the subsequent purchase information and the created listings of determined product identifiers over time for one or more users. Based on the product differences, the model training server retrains one or more of tokenizer model(s) 304, the featurizer model(s) 306 and/or the classifier and extractor model(s) 308 producing one or more retrained tokenizer models, retrained featurizer models and/or retrained classifier and extractor models. In some embodiments the model training server 106 communicates the retrained tokenizer models, retrained featurizer models and/or retrained classifier and extractor models to one or more user computing devices 102 and controls the respective user computing device to replace the tokenizer models, featurizer models and/or classifier and extractor model with the retrained tokenizer models, retrained featurizer models and/or retrained classifier and extractor model to be used with subsequent utterances from the user.

Figure 6:
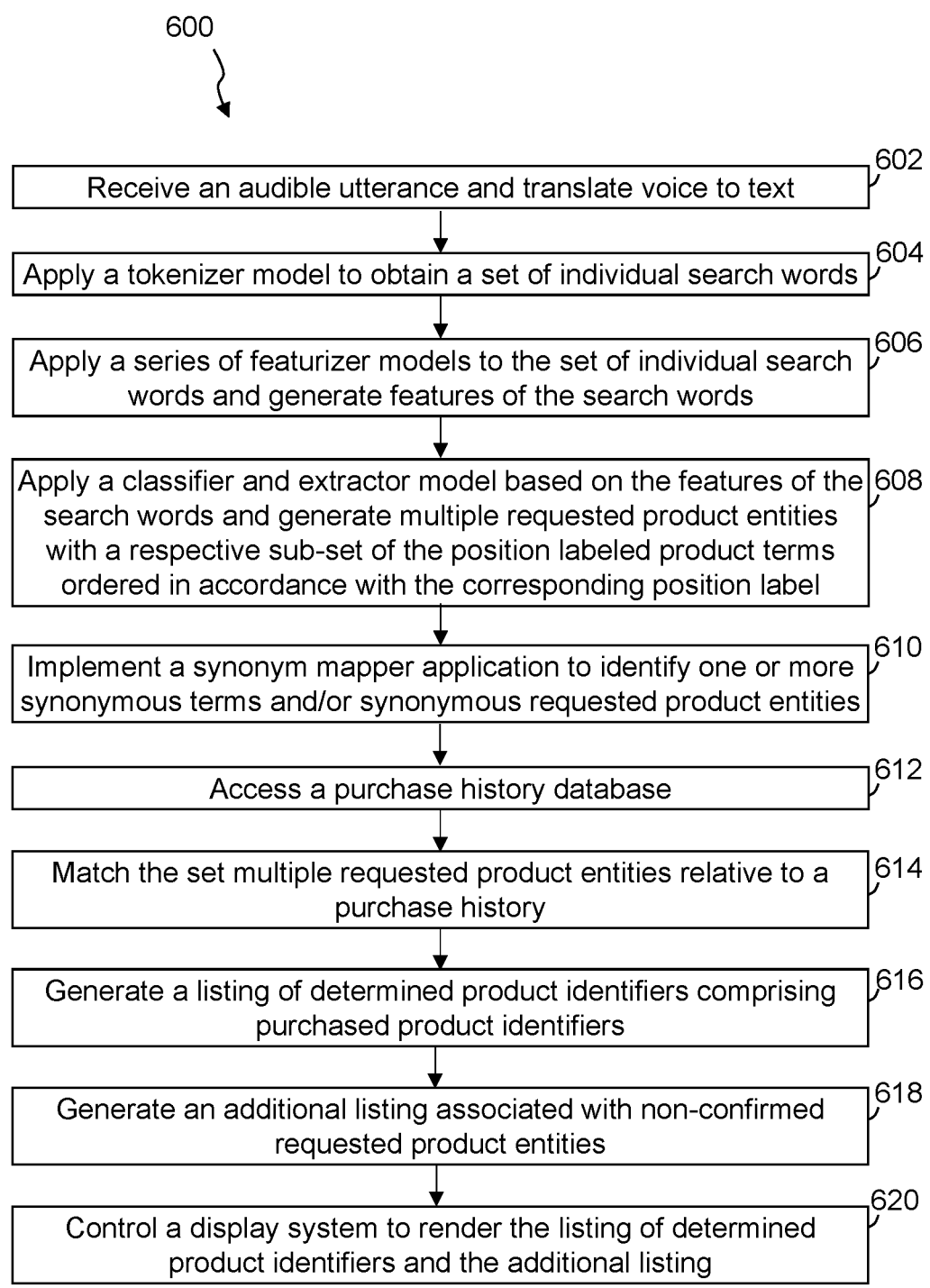
FIG. 6 illustrates a simplified flow diagram of an exemplary process of recognizing items from verbal utterances, in accordance with some embodiments.

FIG. 6 illustrates a simplified flow diagram of an exemplary process 600 of recognizing items from verbal utterances, in accordance with some embodiments. The exemplary process 600 is described below with reference to a process of enabling retail product ordering and/or reordering through verbal utterances. It will be appreciated by those skilled in the art that the process 600 is not limited to retail or ordering, and can be extended to verbal utterances associated with other industries, other commercial environments and the like. In step 602 an audible utterance of a request is received. Typically, the utterance is received through the audio detecting system 212 of the user computing device 102. Additionally or alternatively, the utterance can be received from one or more external audio detection systems and communicated to the user computing device 102. The utterance, in some embodiments, includes a series of request words 352 captured from the audible utterance. The utterance is translated or otherwise converted to text including the request words, which are separated based on respective pauses within the respective utterance. Further, the series of request words typically do not include other delimitators provided in the utterance separating the request words, unless expressly stated in the utterance.

In step 604, a tokenizer model is applied, by a product identifier application interface of the user computing device 102, to the series of request words 652 to obtain a set of individual search words 354 corresponding to the request words from the utterance. As described above, the tokenizer model is trained based on training utterance words each comprising sets of multiple words. In step 606, a series of featurizer models are applied to the set of individual search words 354 to generate features of the search words. In some implementations, the featurizer models are trained based on sets of predefined product identifiers where some of the predefined product identifiers include multiple predefined identifier words corresponding to a single product of multiple different products sold by a retail entity.

In step 608, a classifier and extractor model is applied based on the features of the search words 354, to obtain a listing of multiple requested product entities 358. The classifier and extractor model is typically trained based on the sets of predefined product identifiers comprising multiple product terms each having position labels. Further, in some implementations a plurality of the multiple requested product entities 358 each comprise a respective sub-set of the position labeled product terms ordered in accordance with the corresponding position label dictating a position of the respective position labeled product term relative to the other one or more of the product terms of the respective sub-set of the position labeled product terms of the respective requested product entity. The application of the classifier and extractor model, in some embodiments, includes mapping, by a stack of transformer encoder layers and point wise feed forward layers with relative position attention, an input sequence of the request words to a sequence of continuous representations, and applying a conditional random field decoder model producing a sequence of entity position labels defining the position of the product terms within the respective sub-set of the position labeled product terms of the respective requested product entity. Additionally or alternatively, the classifier and extractor model, in some embodiments, is configured to identify for each of the search words 354 whether the respective search word is considered an individual word or is to be positionally associated with one or more of the other search words. For at least those search words associated with one or more of the other request words, the classifier and extractor model identifies the respective one of the multiple position labels. Similarly, some embodiments further applying the stacked transformer encoder layer models encoding the search words 354 into vector space. A conditional random field model is applied utilizing the vectorized search words to define respective positional labels that define respective search words as an individual word product or part of a multi-word product.

Some embodiments include step 610, where the device control circuit 202 implements a synonym mapper application to identify one or more synonymous terms and/or one or more synonymous requested product entities 360 each corresponding to one or more of the identified requested product entities 358 of the set of multiple requested product entities, and/or synonymous terms corresponding to one or more terms within a requested product entity 358. One or more synonymous requested product entities, each corresponding to one or more requested product entities of the set of multiple requested product entities, can be incorporated into the listing of determined product identifiers. In some embodiments, the one or more synonymous terms and/or synonymous requested product entities are incorporated into the listing of determined product identifiers (e.g., added with a respective one of the entities, appended as an additional entity, etc.). In some implementations, the incorporation includes the respective one or more requested product entities 358 are replaced within the listing with the respective synonymous requested product entity 360. Additionally or alternatively, one or more synonymous terms replace a respective term in one or more of the multiple requested product entities.

In step 612, a purchase history database is access by the device control circuit of the user computing device 102. The purchase history database comprises product information of products previously purchased. In step 614, an accuracy of each of the set multiple requested product entities 358 and/or synonymous requested product entity 360 is confirmed and/or matched relative to a purchase history associated with the user. In step 616, a listing of determined product identifiers 364 is generated comprising purchased product identifiers corresponding to the confirmed set of the multiple requested product entities and/or synonymous requested product entities. Some embodiments access, over the distributed communication network via a transceiver 216 of the user computing device 102, the purchase history database 108b, and identify for each of the set of updated requested product entities 362 and/or requested product entities 358 the corresponding purchased product identifier. The listing of the determined product identifiers can be generated to include the purchased product identifiers in place of the corresponding requested product entity.

In step 618, some embodiments optionally further generate an additional listing associated with unconfirmed requested product entities and/or synonymous requested product entities. The device control circuit can be configured to identify that one or more updated requested product entities 362 and/or requested product entities of the set of multiple requested product entities is unconfirmed (e.g., has not previously been purchased, is not identified as a particular product, etc.). A product inventory database 108a can be accessed corresponding to one or more retail entities associated with the user and/or for which the user is presenting the utterance. For each unconfirmed product, a category of recommended products can be identified corresponding to the unconfirmed requested product entity. The additional listing can be generated to include the one or more categories of recommended products.

In step 620, the device control circuit 202 controls a display system 214 of the user computing device 102 to render the listing of determined product identifiers. Additionally or alternatively, the display system can be controlled to render the additional listing comprising the one or more categories of recommended products and a selectable option that is configured to cause, in response to selection of the selectable option by the user, product information to be displayed for each one or more products associated with the selected category and corresponding to the unconfirmed requested product entity.

Figure 7:
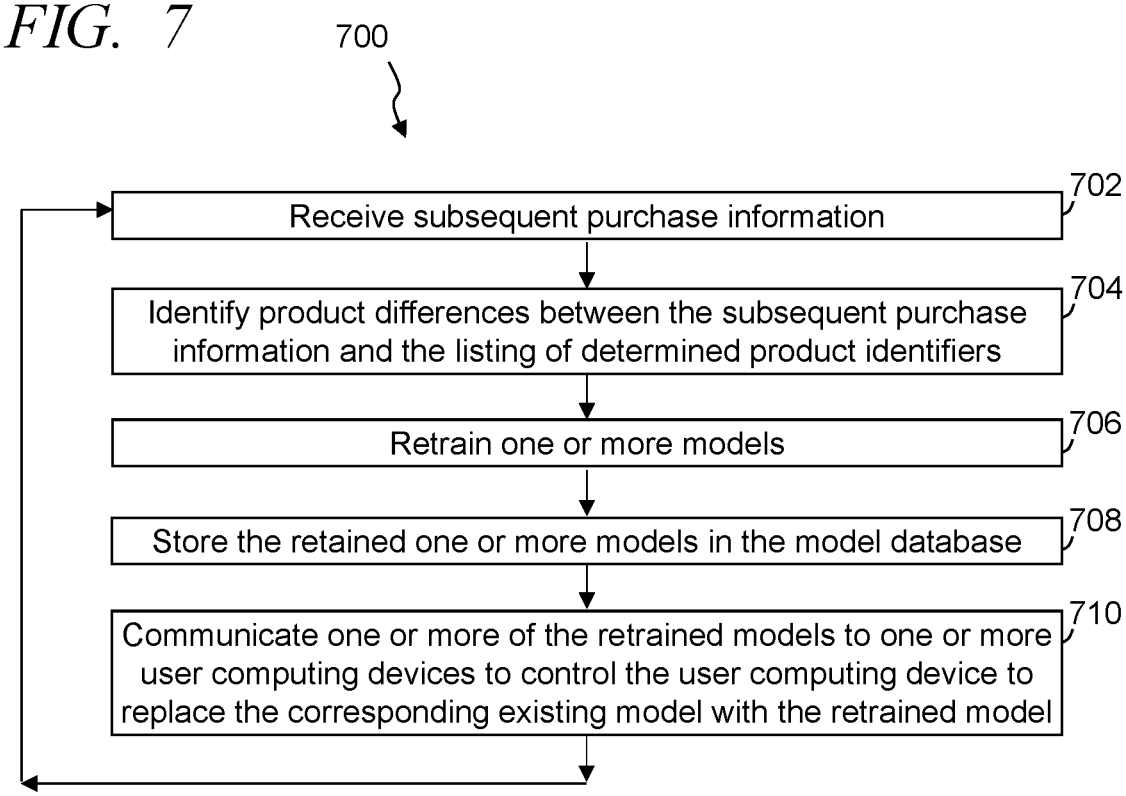
FIG. 7 illustrates a simplified flow diagram of a process of retraining one or more machine learning models and/or neural networks in accordance with some embodiments.

FIG. 7 illustrates a simplified flow diagram of a process 700 of retraining one or more machine learning models and/or neural networks in accordance with some embodiments. In step 702, a retail model training server receives subsequent purchase information from the user computing device 102 following an audible utterance and the generation of the corresponding listing of determined product identifiers. In step 704, product differences are identified between the subsequent purchase information and the listing of determined product identifiers.

In step 706, one or more models are retrained. For example, one or more of one or more of tokenizer model(s) 304, the featurizer model(s) 306 and/or the classifier and extractor model(s) 308 based on the product differences to produce a retrained classifier and extractor model. The retraining produces one or more retrained tokenizer models, retrained featurizer models and/or retrained classifier and extractor models. In step 708, the one or more retrained tokenizer models, retrained featurizer models and/or retrained classifier and extractor models are stored in the machine learning model repository 222. In step 710, at least one of a retrained tokenizer model, a retrained featurizer model and/or a retrained classifier and extractor model is communicated to the user computing device 102 to control the user computing device to replace one or more existing tokenizer models, featurizer models and/or classifier and extractor models with the respective retrained tokenizer model(s), retrained featurizer model(s) and/or retrained classifier and extractor model(s).

In some embodiments, the API 220 and/or an additional virtual shopping cart API 230 further extends the use of the generated listing and/or secondary list to enable the user to add identified items to a virtual shopping cart for purchase. The API 220 and/or shopping cart API 230 can further be configured to enable payment and/or to activate a payment API 232 to complete a sale of the products incorporated into the shopping cart.

Figure 8:
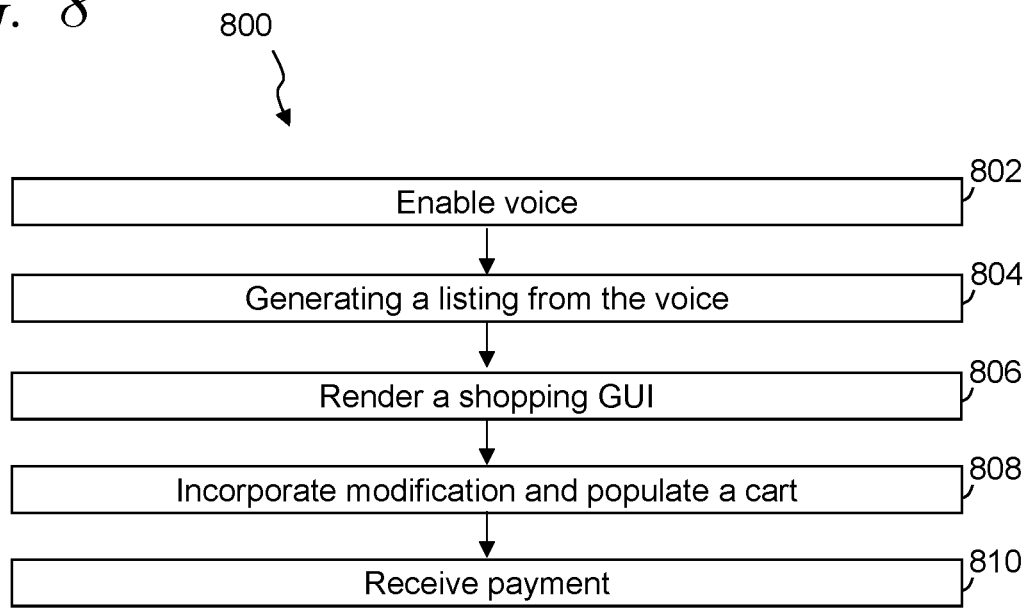
FIG. 8 illustrates a simplified flow diagram of an exemplary process of populating a virtual shopping cart through product recognition from one or more voice utterances, in accordance with some embodiments.

FIG. 8 illustrates a simplified flow diagram of an exemplary process 800 of populating a virtual shopping cart through product recognition from one or more voice utterances, in accordance with some embodiments. In step 802, voice recognition is activated. In some instances, this can include the retail APP 510 receiving, from a microphone or other audio detection system 212 on the user computing device 102, one or more utterances. In step 804, the retail APP 510 can further generate a listing of determined product identifiers 364 as described above. Additionally or alternatively, some embodiments can be further configured to generate additional listing associated with one or more unconfirmed requested product entities and/or synonymous requested product entities when one or more requested products is unconfirmed.

In step 806, a shopping graphical user interface (GUI) is rendered presenting product information associated with the determined product identifiers 364. As described above, in some embodiments, the product information can include substantially any relevant product information, such as but not limited to product name, size information, quantity information, price, discounts, manufacturer identifying information, inventory quantity, retractions, other such information or a combination of two or more of such information. Typically, the shopping GUI enables the user to view the product information and identify those products the customer wishes to add to a virtual cart, remove from a virtual cart (e.g., when automatically incorporated into a virtual cart), adjust quantities, add additional products not identified in the listing of the determined product identifiers 364, shop for other products available through one or more related retail entities, and/or other such actions. For example, some embodiments further display an additional listing of one or more categories associated with one or more unconfirmed requested product entities. As a specific, non-limiting example, the additional listing may include a user selectable displayed option that allows the user to readily access information about one or more products associated with that category, and if desired select one or more of those products to be added to the virtual cart.

In some embodiments, the process 800 further includes step 808 that incorporates modifications made by the user through the shopping GUI (e.g., removing or unselecting one or more of the determined product identifiers 364 identified in the listing of determined product identifiers, adding one or more additional products, enabling quantities for one or more products to be adjusted, and/or other such actions). Further, in some implementations, the virtual cart can be finalized and a payment option selected. In optional step 810, some embodiments enable a user to complete the purchase of products in the virtual cart through the shopping GUI and/or a payment GUI.

Accordingly, the speech recognition of products enables the user to quickly and easily populate a shopping cart. Further, the enhanced speech recognition provided through the retail product ordering system 300 and/or voice ordering system 500 improves the accuracy of identifying products, reduces the likelihood of incorrect interpretations of speech, and in some implementations further confirms specific products based on a purchase history in order to populate the cart with the particular product the customer actually intends to purchase when uttering a general product identifier (e.g., uttering "PEPSI", and confirming based on purchase history that the utterance of "PEPSI" corresponds to a two-liter bottle of PEPSI-COLA soda, instead of other potential PEPSI products (e.g., 6-pack of 12-oz cans of PEPSI-COLA, 12-pack of 12-oz cans of PEPSI-COLA, other PEPSI products, etc.). Accordingly, the user can utter similar and/or more generic terms while the item identifier system 100 still accurately identifies the actual intended product. This can be particularly relevant when a user is re-ordering products that the user has previously purchased. As described above, however, the product recognition from verbal utterances is still further enhances through the retail product ordering system 300 and/or voice ordering system 500 for products not previously purchased. Some embodiments use the confirmation relative to purchases by other user, applies weightings based on the user's prior purchases relative to other users purchases, and/or other such factors.

Still further, the accuracy of the entity recognition is achieved even without punctuation and/or other delimiters. The retail product ordering system 300 and/or voice ordering system 500 provides a voice ordering named entity recognition (NER) model that captures multiple product entities, which may not be separated by punctuations or other delimiters, within a given utterance. For example, with an utterance of "broccoli coffee pineapple ice cream chips freshly made tortillas." Other entity recognition systems are incapable of effectively and accurately identifying individual products from this utterance (e.g., does the utterance intend a "broccoli coffee" product, does the utterance intend a "pineapple ice cream" or a "coffee pineapple ice" or a "coffee pineapple ice cream", does the utterance intend "pineapple ice", does the utterance intend "cream chips" or "ice cream chips", or "pineapple ice cream chips", etc.). The item identifier system 100 employs the transformer based multi-task (DIET) model architecture, with pre-trained language model (e.g., ConveRT) features, and post processing through synonym mapping and/or lookup confirmation to greatly improve the accuracy of item recognition extracted from one or more voice utterances. This system can be further enhanced through repeated training based on feedback, and in some instances retrained and fine-tuned for a specific customer. Still further, some embodiments reducing reorder voice model training time by using Rasa incremental training. This in part enables product identification to be performed on the user's portable computing device without requiring connection to a remote server, relying on remote processing, and/or communicating some or all of the utterance and/or information from the utterance to a remote system. The user computing devices, however, can be utilized to access remote databases and/or communicate with remote servers when accessible to obtain information, communicate some or all of the utterances and/or captured words from the utterances, and/or utilize remote processing by one or more remote systems.

Additionally, the system augments search and personalization with voice ordering. Further, the training of the models enables the ability to translate voice, with common accents, into a text string and to parse a verbal shopping list string into specific items. Similarly, the system can accurately match relevant items from verbal shopping lists and provide users confidence in the accuracy of their orders.

Figure 9:
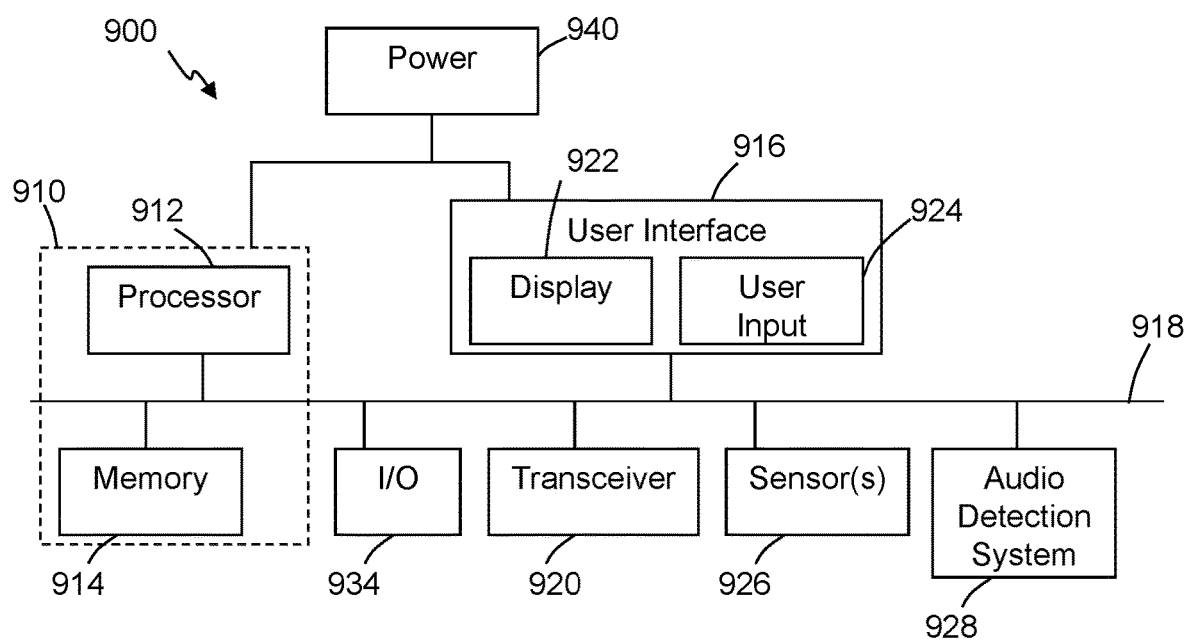
FIG. 9 illustrates an exemplary system for use in implementing methods, techniques, devices, apparatuses, systems, servers, and/or sources in providing speech recognition and identifying requested products, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 9 illustrates an exemplary system 900 that may be used for implementing any of the components, circuits, circuitry, systems, functionality, apparatuses, processes, or devices of the item identifier system 100, and/or other above or below mentioned systems or devices, or parts of such circuits, circuitry, functionality, systems, apparatuses, processes, or devices. For example, the system 900 may be used to implement some or all of the user computing devices 102, model training servers 106, databases 108, e-commerce server 112, point of sale systems 114, inventory systems 116, product distribution systems 120, retail product ordering system 300, voice ordering system 500, and/or other such components, circuitry, functionality and/or devices. However, the use of the system 900 or any portion thereof is certainly not required.

By way of example, the system 900 may comprise a control circuit or processor module 912, memory 914, and one or more communication links, paths, buses or the like 918. Some embodiments may include one or more user interfaces 916, and/or one or more internal and/or external power sources or supplies 940. The control circuit 912 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 912 can be part of control circuitry and/or a control system 910, which may be implemented through one or more processors with access to one or more memory 914 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 900 may be used to implement one or more of the above or below, or parts of, components, circuits, systems, processes and the like.

The user interface 916 can allow a user to interact with the system 900 and receive information through the system. In some instances, the user interface 916 includes a display 922 and/or one or more user inputs 924, such as buttons, touch screen, track ball, keyboard, mouse, etc., which can be part of or wired or wirelessly coupled with the system 900. Typically, the system 900 further includes one or more communication interfaces, ports, transceivers 920 and the like allowing the system 900 to communicate over a communication bus, a distributed computer and/or one or more communication networks 104 (e.g., a local area network (LAN), the Internet, wide area network (WAN), cellular communication, satellite, etc.), communication link 918, other networks or communication channels with other devices and/or other such communications or combination of two or more of such communication methods. Further the transceiver 920 can be configured for wired, wireless, optical, fiber optical cable, satellite, or other such communication configurations or combinations of two or more of such communications. Some embodiments include one or more input/output (I/O) ports 934 that allow one or more devices to couple with the system 900. The I/O ports can be substantially any relevant port or combinations of ports, such as but not limited to USB, Ethernet, or other such ports. The I/O interface 934 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 926 to provide information to the system and/or sensor information that is communicated to another component, such as inventory system 116, the e-commerce server 112, a point of sale system 114, a central control system, a delivery vehicle, etc. The sensors can include substantially any relevant sensor, such as optical-based scanning sensors to sense and read optical patterns (e.g., bar codes), radio frequency identification (RFID) tag reader sensors capable of reading RFID tags in proximity to the sensor, image capture systems, text capture systems, acceleration detection systems, gyroscope, distance measurement sensors (e.g., optical units, sound/ultrasound units, etc.), other such sensors, or a combination of two or more sensor systems. The foregoing examples are intended to be illustrative and are not intended to convey an exhaustive listing of all possible sensors. Instead, it will be understood that these teachings will accommodate sensing any of a wide variety of circumstances in a given application setting.

The system 900 comprises an example of a control and/or processor-based system with the control circuit 912. Again, the control circuit 912 can be implemented through one or more processors, controllers, central processing units, logic, software and the like. Further, in some implementations the control circuit 912 may provide multiprocessor functionality.

The memory 914, which can be accessed by the control circuit 912, typically includes one or more processor-readable and/or computer-readable media accessed by at least the control circuit 912, and can include volatile and/or nonvolatile media, such as RAM, ROM, EEPROM, flash memory and/or other memory technology. Further, the memory 914 is shown as internal to the control system 910; however, the memory 914 can be internal, external or a combination of internal and external memory. Similarly, some or all of the memory 914 can be internal, external or a combination of internal and external memory of the control circuit 912. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer and/or communication networks 104. The memory 914 can store code, software, executables, scripts, data, content, lists, programming, programs, log or history data, user information, customer information, product information, and the like. While FIG. 9 illustrates the various components being coupled together via a bus, it is understood that the various components may actually be coupled to the control circuit and/or one or more other components directly.

Further, while the above and below description generally is related to retail ordering and/or the identification of retail products, the described systems and processes are not limited to a retail environment, the identification of retail products or the ordering of retail products. Instead, the systems and methods are applicable to speech recognition in general and provide for improved speech recognition of multiple entities within a single utterance when no or limited punctuation or other delimiters are presented in the utterance. Accordingly, the reader should not restrict the above described systems, sub-systems, methods, apparatuses and/or processes to retail or product ordering. Similarly, the above and below description generally references to identification of entities based on verbal utterances. The described systems and processes, however, can similarly be applied to received text, captured text, images, and/or other types of data. For example, the user computing device 102 may receive a set of text typed into the user device through a keyboard, touchscreen or the like, and/or communicated to the user computing device. Similarly, the user computing device 102, in some embodiments, may include one or more cameras and/or other image capture systems that can capture an image of one or more lines of text comprising one or more words, and apply one or more text capture algorithms and/or applications to identify text that can be evaluated through some or all of the item identifier system 100, the retail product ordering system 300 and/or voice ordering system 500 in identifying a set of one or more entities from the captured text. Again, as described above, the received information (e.g., utterance, image, text, etc.) may or may not include punctuation and/or other delimiters. The above described entity identification operates with or without such delimiters.

Some embodiments provide retail product ordering systems comprising: a user computing device comprising a transceiver, an audio detecting system, and an application stored in memory that when executed by a device control circuit of the user computing device is configured to: receive an audible utterance of a request comprising a series of request words separated based on respective pauses and does not include other delimiters; controls a product identifier application interface to: apply a tokenizer model, trained based on training utterance words each comprising sets of multiple words, to the series of request words and obtain a set of individual search words corresponding to the request words from the utterance; apply a series of featurizer models, trained based on sets of predefined product identifiers comprising multiple predefined identifier words corresponding to a respective single product, to the set of individual search words to generate features of the search words; and apply a classifier and extractor model, trained based on the sets of predefined product identifiers comprising multiple product terms each having position labels, based on the features of the search words and generate multiple requested product entities each comprising a respective sub-set of the position labeled product terms ordered in accordance with the corresponding position label; wherein the device control circuit is further configured to access a purchase history database comprising product information of products previously purchased, confirm an accuracy of each of the set of multiple requested product entities relative to a purchase history associated with the user, generate a listing of determined product identifiers comprising purchased product identifiers corresponding to the confirmed set of the multiple requested product entities, and control a display system of the user computing device to render the listing of determined product identifiers.

Some embodiments provide methods of enabling retail product ordering comprising: a transceiver of the user computing device configured to communicate over one or more distributed communication networks; an audio detecting system of the user computing device configured to capture audio input; a machine learning model repository of the user computing device and configured to maintain on the memory a set of machine learning models comprising: a tokenizer model, an entity transformer (ET) modeling, and a classifier and extractor model; and an application stored in memory of a user computing device and when executed by a device control circuit of the user computing device is configured to: receiving, through an audio detecting system of a user computing device, an audible utterance of a request comprising a series of request words captured from the audible utterance, wherein the request words are separated based on respective pauses within the respective utterance and the series of request words does not include other delimitators provided in the utterance separating the request words; applying, by a product identifier application interface, a tokenizer model, trained based on training utterance words each comprising sets of multiple words, to the series of request words and obtaining a set of individual search words corresponding to the request words from the utterance; applying a series of featurizer models, trained based on sets of predefined product identifiers wherein each of a plurality of the sets of the predefined product identifiers comprises multiple predefined identifier words corresponding to a single product of multiple different products sold by a retail entity, to the set of individual search words and generating features of the search words; applying a classifier and extractor model, trained based on the sets of predefined product identifiers comprising multiple product terms each having position labels, based on the features of the search words and generating multiple requested product entities, wherein a plurality of the multiple requested product entities each comprise a respective sub-set of the position labeled product terms ordered in accordance with the corresponding position label dictating a position of the respective position labeled product term relative to the other one or more product terms of the respective sub-set of the position labeled product terms of the respective requested product entity; accessing, by a device control circuit of the user computing device, a purchase history database comprising product information of products previously purchased, confirming an accuracy of each of the set multiple requested product entities relative to a purchase history associated with the user, generating a listing of determined product identifiers comprising purchased product identifiers corresponding to the confirmed set of the multiple requested product entities, and controlling a display system of the user computing device to render the listing of determined product identifiers.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A retail product ordering system comprising:
   a user computing device comprising a transceiver, an audio detecting system, and an application stored in memory that when executed by a device control circuit of the user computing device is configured to:
   receive an audible utterance of a request comprising a series of request words separated based on respective pauses and does not include other delimiters;
   controls a product identifier application interface to:
   apply a tokenizer model, trained based on training utterance words each comprising sets of multiple words, to the series of request words and obtain a set of individual search words corresponding to the request words from the utterance;

apply a series of featurizer models, trained based on sets of predefined product identifiers comprising multiple predefined identifier words corresponding to a respective single product, to the set of individual search words to generate features of the search words; and apply a classifier and extractor model, trained based on the sets of predefined product identifiers comprising multiple product terms each having position labels, based on the features of the search words and generate multiple requested product entities each comprising a respective sub-set of the position labeled product terms ordered in accordance with the corresponding position label;

wherein the device control circuit is further configured to access a purchase history database comprising product information of products previously purchased, confirm an accuracy of each of the set of multiple requested product entities relative to a purchase history associated with the user, generate a listing of determined product identifiers comprising purchased product identifiers corresponding to the confirmed set of the multiple requested product entities, and control a display system of the user computing device to render the listing of determined product identifiers.

2. The retail product ordering system of claim 1, wherein the device control circuit, prior to confirming the accuracy, is further configured to implement a synonym mapper application configured to identify a synonymous requested product entity corresponding to a first requested product entity of the set of multiple requested product entities and incorporates the synonymous requested product entity within the listing of determined product identifiers.

3. The retail product ordering system of claim 2, wherein the device control circuit, in incorporating the synonymous requested product entity within the listing of determined product identifiers, is configured to replace the first requested product entity within the listing of determined product identifiers with the synonymous requested product entity.

4. The retail product ordering system of claim 2, wherein the classifier and extractor model comprises a stack of transformer encoder layers and point wise feed forward layers with relative position attention that maps an input sequence of the request words to a sequence of continuous representations, and a conditional random field decoder model that produces a sequence of entity position labels defining the position of the product terms within the respective sub-set of the position labeled product terms of the respective requested product entity.

5. The retail product ordering system of claim 1, wherein the classifier and extractor model is configured to identify for each of the search words whether the respective search word is considered an individual word or is to be positionally associated with one or more of the other search words as one set of the sets of predefined product identifiers; and identify, for those search words associated with one or more of the other search words, the respective one of the multiple position labels.

6. The retail product ordering system of claim 5, wherein the classifier and extractor model comprises stacked transformer encoder layer models configured to encode the search words into vector space, and a conditional random field model utilizing the vectorized search words to define the respective positional labels defining respective search words as an individual word product or part of a multi-word product.

7. The retail product ordering system of claim 1, wherein the device control circuit in accessing the purchase history database is configured to access, over the distributed communication network via the transceiver, the purchase history database, identify for each of the set of multiple requested product entities the corresponding purchased product identifier, and generate the listing of the determined product identifiers comprising the purchased product identifiers in place of the corresponding requested product entity.

8. The system of claim 7, wherein the device control circuit is further configured to determine that a first requested product entity of the set of multiple requested product entities has not previously been purchased, and access a product inventory database corresponding to the retail entity, identify a first category of recommended products corresponding to the first requested product entity, generate a second listing comprising the first category of recommended products, and control the display system of the user computing device to render the second listing comprising the first category of recommended products and a selectable option that is configured to cause, in response to selection of the selectable option by the user, product information to be displayed for each one or more products associated with the first category and corresponding to the first requested product entity.

9. The retail product ordering system of claim 1, further comprising:

a retail model training server communicatively coupled with and configured to receive, over at least one of the one or more distributed communication networks, subsequent purchase information from the user computing device following the audible utterance and the generation of the listing of determined product identifiers;

identify product difference between the subsequent purchase information and the listing of determined product identifiers;

retrain at least the classifier and extractor model based on the product differences to produce a retrained classifier and extractor model; and communicate the retrained classifier and extractor model to the user computing device to control the user computing device to replace the classifier and extractor model with the retrained classifier and extractor model to be used with subsequent order utterances from the user.

10. A method of enabling retail product ordering comprising:

a transceiver of the user computing device configured to communicate over one or more distributed communication networks;

an audio detecting system of the user computing device configured to capture audio input;

a machine learning model repository of the user computing device and configured to maintain on the memory a set of machine learning models comprising: a tokenizer model, an entity transformer (ET) modeling, and a classifier and extractor model; and an application stored in memory of a user computing device and when executed by a device control circuit of the user computing device is configured to:

receiving, through an audio detecting system of a user computing device, an audible utterance of a request comprising a series of request words captured from the audible utterance, wherein the request words are separated based on respective pauses within the respective utterance and the series of request words does not include other delimitators provided in the utterance separating the request words;

applying, by a product identifier application interface, a tokenizer model, trained based on training utterance words each comprising sets of multiple words, to the series of request words and obtaining a set of individual search words corresponding to the request words from the utterance;

applying a series of featurizer models, trained based on sets of predefined product identifiers wherein each of a plurality of the sets of the predefined product identifiers comprises multiple predefined identifier words corresponding to a single product of multiple different products sold by a retail entity, to the set of individual search words and generating features of the search words;

applying a classifier and extractor model, trained based on the sets of predefined product identifiers comprising multiple product terms each having position labels, based on the features of the search words and generating multiple requested product entities, wherein a plurality of the multiple requested product entities each comprise a respective sub-set of the position labeled product terms ordered in accordance with the corresponding position label dictating a position of the respective position labeled product term relative to the other one or more product terms of the respective sub-set of the position labeled product terms of the respective requested product entity;

accessing, by a device control circuit of the user computing device, a purchase history database comprising product information of products previously purchased, confirming an accuracy of each of the set multiple requested product entities relative to a purchase history associated with the user, generating a listing of determined product identifiers comprising purchased product identifiers corresponding to the confirmed set of the multiple requested product entities, and controlling a display system of the user computing device to render the listing of determined product identifiers.

11. The method of claim 10, further comprising:
implementing, by the device control circuit and prior to confirming the accuracy, a synonym mapper application, identifying a synonymous requested product entity corresponding to a first requested product entity of the set of multiple requested product entities, and incorporating the synonymous requested product entity into the listing of determined product identifiers.

12. The method of claim 11, wherein the incorporating the synonymous requested product entity into the listing of determined product identifiers comprises replacing the first requested product entity within the listing of determined product identifiers with the synonymous requested product entity.

13. The method of claim 11, wherein the applying the classifier and extractor model comprises mapping, by a stack of transformer encoder layers and point wise feed forward layers with relative position attention, an input sequence of the request words to a sequence of continuous representations; and applying a conditional random field decoder model producing a sequence of entity position labels defining the position of the product terms within the respective sub-set of the position labeled product terms of the respective requested product entity.

14. The method of claim 10, wherein the applying the classifier and extractor model comprises identifying for each of the request words whether the respective request word is considered an individual word or is to be positionally associated with one or more of the other request words; and identifying, for those request words associated with one or more of the other request words, the respective one of the multiple position labels.

15. The method of claim 14, wherein the applying the classifier and extractor model comprises:
applying stacked transformer encoder layer models encoding the search words into vector space; and
applying a conditional random field model utilizing the vectorized search words and defining the respective positional labels that define respective search words as an individual word product or part of a multi-word product.

16. The method of claim 10, wherein the accessing the purchase history database comprises:
accessing, over the distributed communication network via a transceiver of the user computing device, the purchase history database;
identifying for each of the set of multiple requested product entities the corresponding purchased product identifier; and
generating the listing of the determined product identifiers comprising the purchased product identifiers in place of the corresponding requested product entity.

17. The method of claim 16, further comprising:
determining, by the device control circuit, that a first requested product entity of the set of multiple requested product entities has not previously been purchased;
accessing a product inventory database corresponding to the retail entity;
identify a first category of recommended products corresponding to the first requested product entity;
generating a second listing comprising the first category of recommended products, and
controlling the display system of the user computing device to render the second listing comprising the first category of recommended products and a selectable option that is configured to cause, in response to selection of the selectable option by the user, product information to be displayed for each one or more products associated with the first category and corresponding to the first requested product entity.

18. The method of claim 10, further comprising:
receiving, at a retail model training server communicatively coupled with a distributed communication network and from over at least one of the one or more distributed communication networks, subsequent purchase information from the user computing device following the audible utterance and the generation of the listing of determined product identifiers;
identifying product differences between the subsequent purchase information and the listing of determined product identifiers;
retraining at least the classifier and extractor model based on the product differences to produce a retrained classifier and extractor model; and
communicating the retrained classifier and extractor model to the user computing device to control the user computing device to replace the classifier and extractor model with the retrained classifier and extractor model to be used with subsequent order utterances from the user.

* * * * *